United States Patent
Fukui et al.

(10) Patent No.: US 11,012,121 B2
(45) Date of Patent: May 18, 2021

(54) WIRELESS TERMINAL, TRANSMISSION POWER CONTROL METHOD OF WIRELESS TERMINAL, AND RADIO BASE STATION

(71) Applicant: MITSUBISHI ELECTRIC CORPORATION, Tokyo (JP)

(72) Inventors: Noriyuki Fukui, Tokyo (JP); Keijiro Take, Tokyo (JP); Mitsuhiro Hashimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/486,435

(22) PCT Filed: Jul. 28, 2017

(86) PCT No.: PCT/JP2017/027389
§ 371 (c)(1),
(2) Date: Aug. 15, 2019

(87) PCT Pub. No.: WO2018/167998
PCT Pub. Date: Sep. 20, 2018

(65) Prior Publication Data
US 2020/0112347 A1    Apr. 9, 2020

(30) Foreign Application Priority Data
Mar. 15, 2017 (WO) .................. PCT/JP2017/010342

(51) Int. Cl.
*H04W 16/28* (2009.01)
*H04W 52/14* (2009.01)
(Continued)

(52) U.S. Cl.
CPC ............. *H04B 7/043* (2013.01); *H04B 7/088* (2013.01); *H04W 16/28* (2013.01);
(Continued)

(58) Field of Classification Search
CPC . H04W 16/28; H04W 52/42; H04W 72/0473; H04W 52/146; H04W 52/242;
(Continued)

(56) References Cited

U.S. PATENT DOCUMENTS 7,190,957 B2    3/2007 Okawa et al.
2006/0270434 A1* 11/2006 Iacono ................. H04B 7/0604
455/522

(Continued)

FOREIGN PATENT DOCUMENTS

WO    WO 2006/016485 A1    2/2006
WO    WO 2011/043720 A1    4/2011

OTHER PUBLICATIONS

PCT/JP2017/027389, 5 pages (Year: 2017).*
(Continued)

*Primary Examiner* — Inder P Mehra
(74) *Attorney, Agent, or Firm* — Birch, Stewart, Kolasch & Birch, LLP

(57) ABSTRACT

A wireless terminal includes: an antenna that receives a plurality of beams formed by a radio base station; and a power control unit that adjusts transmission power of an uplink signal transmitted from the antenna to the radio base station after beam switching, on the basis of a reception power difference between a downlink signal of a beam used before the beam switching and a downlink signal of a beam to be used after beam switching, the beam switching being switching of a beam used for communication with the radio base station among the beams formed by the radio base station.

14 Claims, 9 Drawing Sheets

(51) Int. Cl.
| | |
|---|---|
| *H04W 52/24* | (2009.01) |
| *H04W 52/42* | (2009.01) |
| *H04W 52/02* | (2009.01) |
| *H04W 72/04* | (2009.01) |
| *H04W 74/08* | (2009.01) |
| *H04B 7/0426* | (2017.01) |
| *H04B 7/08* | (2006.01) |
| *H04B 7/06* | (2006.01) |
| *H04B 7/0456* | (2017.01) |
| *H04B 1/04* | (2006.01) |
| *H04B 7/0413* | (2017.01) |
| *H04L 5/00* | (2006.01) |

(52) U.S. Cl.
CPC ....... *H04W 52/146* (2013.01); *H04W 52/242* (2013.01); *H04W 52/42* (2013.01); *H04W 72/0473* (2013.01); *H04B 7/0626* (2013.01); *H04L 5/0048* (2013.01); *H04W 52/0245* (2013.01); *H04W 74/0833* (2013.01)

(58) Field of Classification Search
CPC .......... H04W 52/0245; H04W 74/0833; H04B 7/043; H04B 7/088; H04B 7/0626; H04L 5/0048
USPC ........................................................ 455/455
See application file for complete search history.

(56) References Cited

U.S. PATENT DOCUMENTS

| | | | |
|---|---|---|---|
| 2009/0207780 A1 | 8/2009 | Kishigami et al. | |
| 2011/0158177 A1 | 6/2011 | Kishigami et al. | |
| 2012/0195224 A1 | 8/2012 | Kazmi et al. | |
| 2012/0300704 A1 | 11/2012 | Kishigami et al. | |
| 2015/0346345 A1* | 12/2015 | Bartone ............... | H01Q 3/2617 342/357.59 |
| 2016/0094282 A1 | 3/2016 | Kazmi et al. | |
| 2017/0318541 A1* | 11/2017 | Islam .................... | H04W 52/42 |
| 2020/0028599 A1* | 1/2020 | Zhang ..................... | H04B 7/08 |

OTHER PUBLICATIONS

"Discussion on uplink power control for NR", LG Electronics, 3GPP TSG RAN WG1 Meeting #88; R1-1702468, Athens, Greece; Feb. 13-17, 2017.
"Power Control for MIMO", Nokia, Alcatel-Lucent Shanghai Bell, R1-1610283, 3GPP TSG-RAN WG1 Meeting #86bix, Lisbon, Portugal, Oct. 10-14, 2016.
"Uplink Power Control for MIMO," R1-1701109, 3GPP TSG RAN WG1 NR Ad-Hoc Meeting, Spokane, USA, Jan. 16-20, 2017.
Extended European Search Report issued in corresponding European Application No. 17900487.4 dated Jan. 3, 2020.
3GPP TS 36.213 V14.1.0 (Dec. 2016), Release 14, "5. Power Control," pp. 14-48.
Communication pursuant to Article 94(3) EPC issued Oct. 13, 2020 in corresponding European Application No. 17900487.4.
Huawei et al. "Detailed considerations on UL power control design for NR", 3GPP Draft; R1-1701688; 3GPP, Mobile Competence Centre; 650, Route Des Lucioles; F-06921 Sophia-Antipolis Cedex; France, vol. RAN WG1, no. Athens, Greece, Feb. 13-17, 2017, XP051208854.
Communication pursuant to Article 94(3) EPC dated Mar. 15, 2021 in corresponding European Application No. 17900487.4.

* cited by examiner

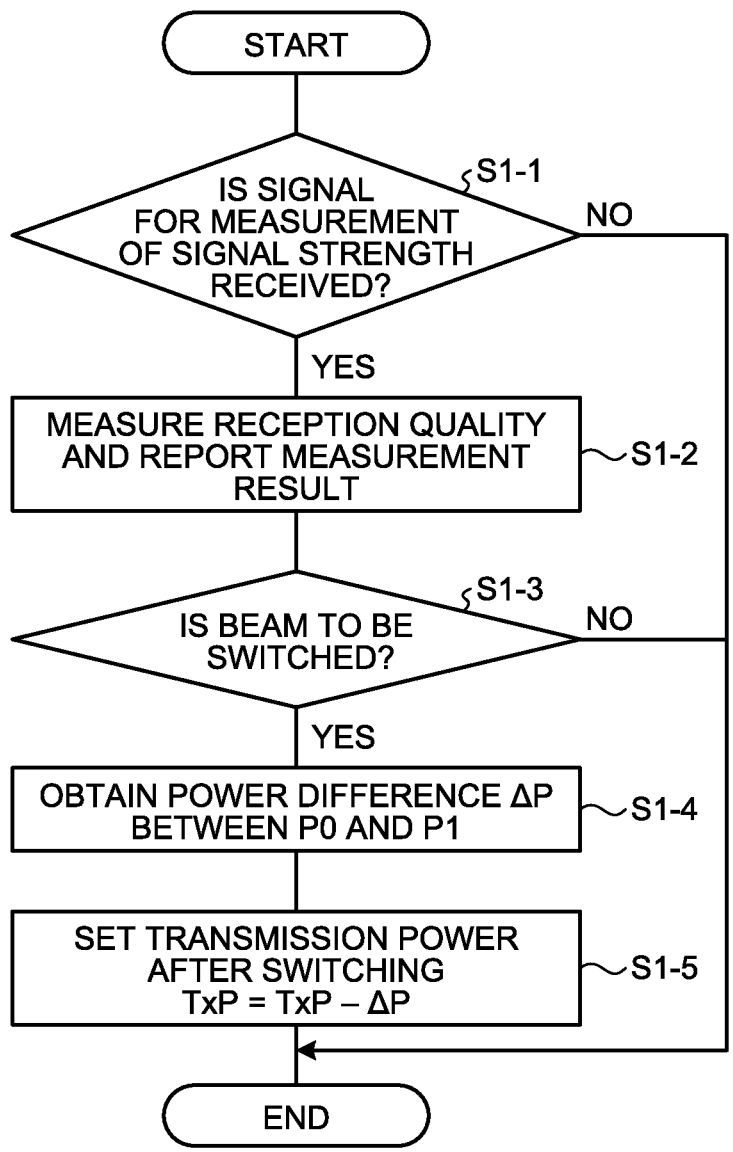

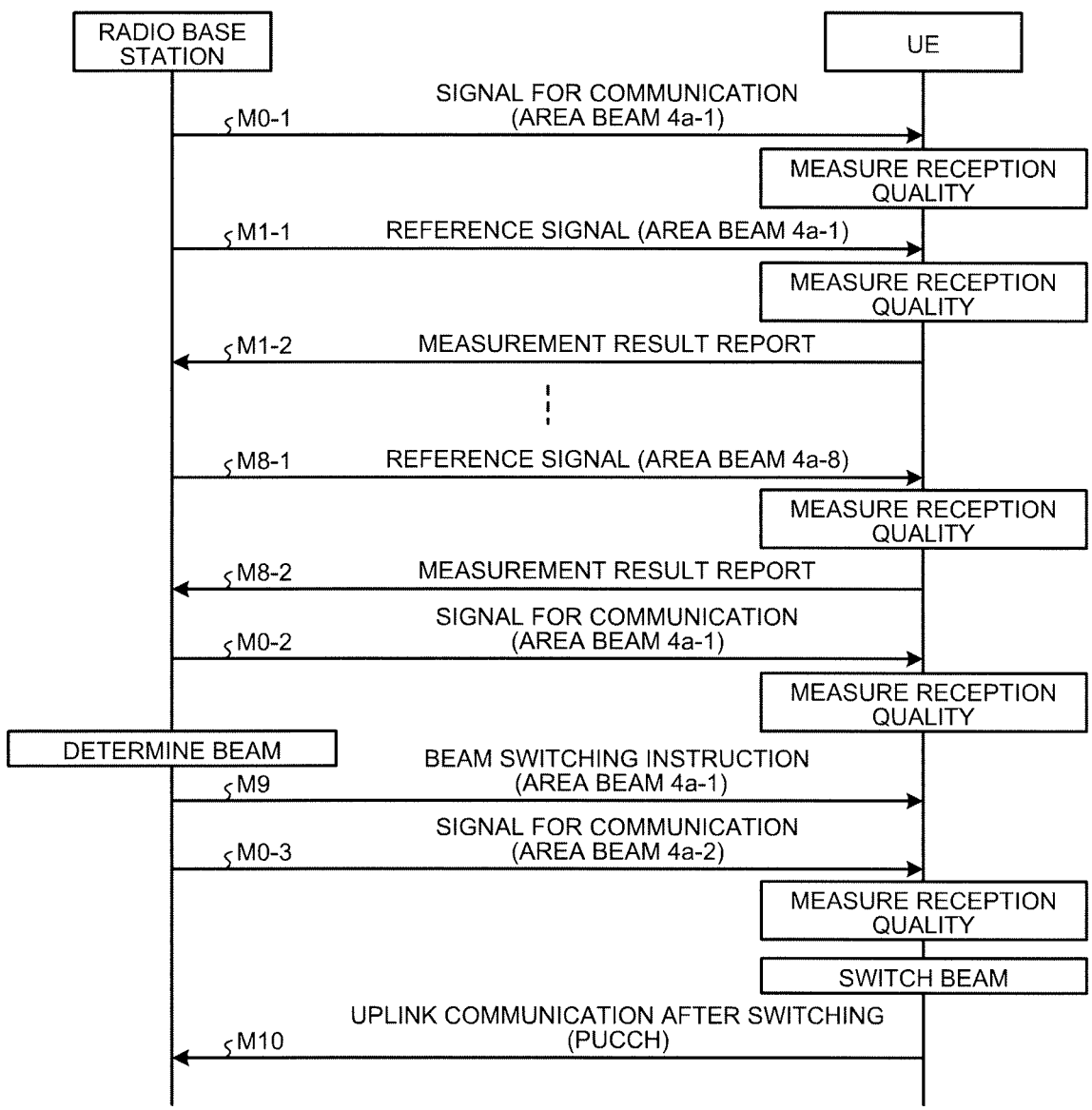

FIG.10

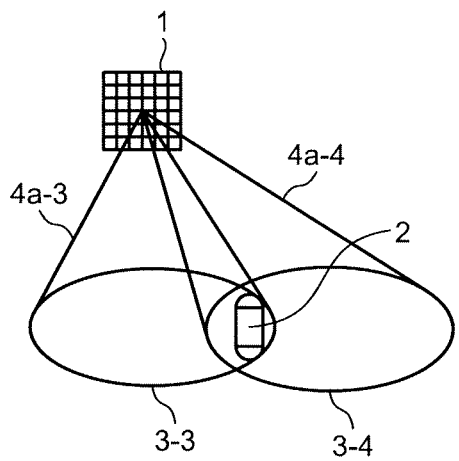

FIG.11A

| TRANS-MISSION POWER TxP [dBm] | PATH LOSS [dB] | RECEIVING ANTENNA GAIN [dB] OF AREA BEAM 4a-3 | RECEPTION POWER [dBm] OF RADIO BASE STATION 1 | RECEPTION POWER TARGET VALUE [dBm] OF RADIO BASE STATION 1 |
|---|---|---|---|---|
| 20 | 90 | 20 | -50 | -50 |

FIG.11B

| TRANS-MISSION POWER TxP [dBm] | PATH LOSS [dB] | RECEIVING ANTENNA GAIN [dB] OF AREA BEAM 4a-4 | RECEPTION POWER [dBm] OF RADIO BASE STATION 1 | RECEPTION POWER TARGET VALUE [dBm] OF RADIO BASE STATION 1 |
|---|---|---|---|---|
| 10 | 90 | 30 | -50 | -50 |

FIG.11C

| TRANS-MISSION POWER TxP [dBm] | PATH LOSS [dB] | RECEIVING ANTENNA GAIN [dB] OF AREA BEAM 4a-4 | RECEPTION POWER [dBm] OF RADIO BASE STATION 1 | RECEPTION POWER TARGET VALUE [dBm] OF RADIO BASE STATION 1 |
|---|---|---|---|---|
| 20 | 90 | 30 | -40 | -50 |

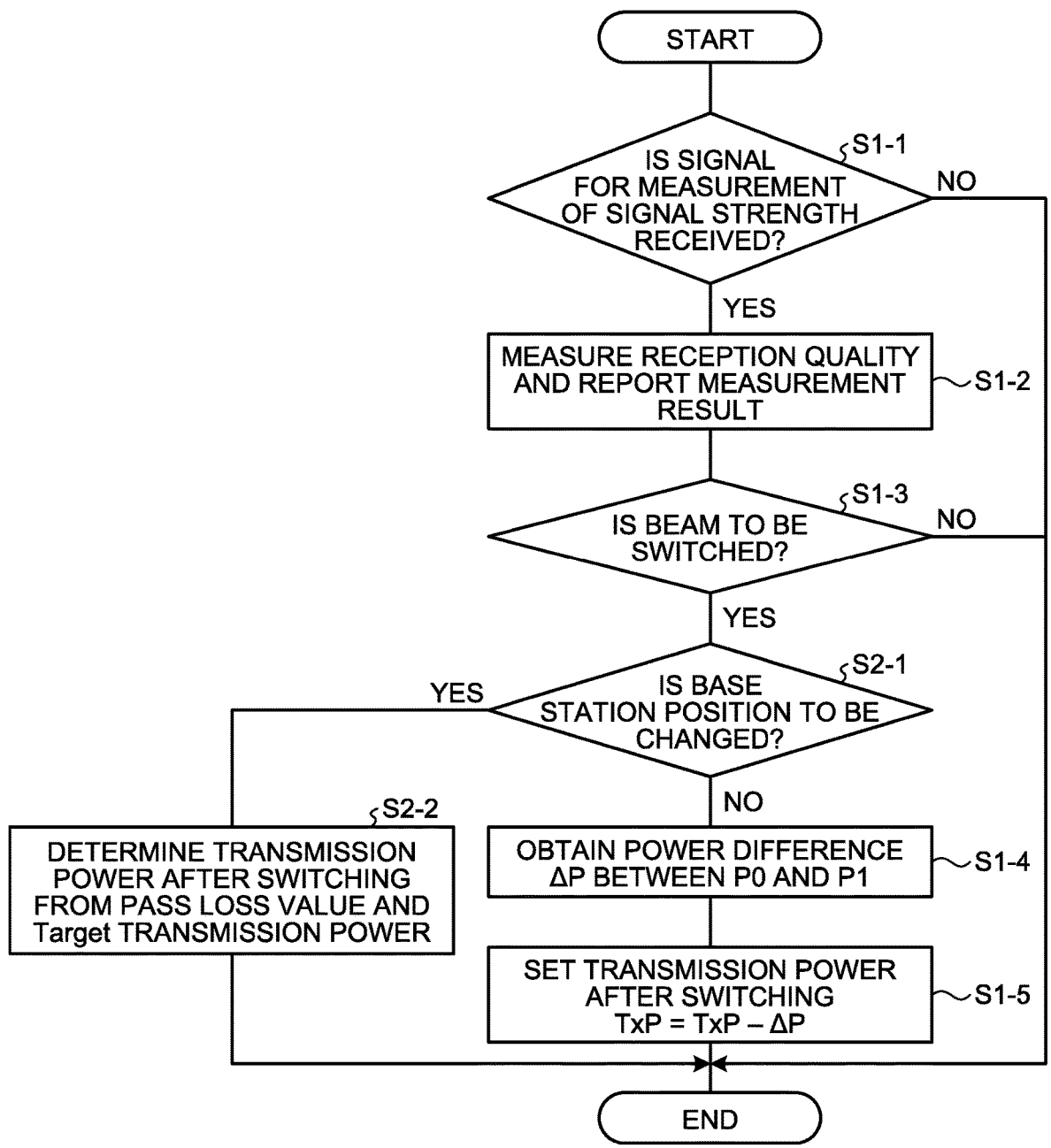

WIRELESS TERMINAL, TRANSMISSION POWER CONTROL METHOD OF WIRELESS TERMINAL, AND RADIO BASE STATION

FIELD

The present invention relates to a technology for controlling transmission power of a wireless terminal that communicates with a radio base station.

BACKGROUND

Wireless terminals communicating with radio base stations typically perform transmission power control of radio waves transmitted to the radio base stations. According to the Long Term Evolution (LTE) standard specified in the 3rd Generation Partnership Project (3GPP), the radio base station transmits a channel state information reference signal (CSI-RS) to a wireless terminal, and the wireless terminal reports, to the radio base station, channel state information (CSI) that is a channel quality measured on the basis of the CSI-RS. The wireless terminal periodically transmits the CSI to the radio base station. For transmission of the CSI to the radio base station, a physical uplink control channel (PUCCH) is used. If the wireless terminal transmits the PUCCH with unnecessarily high transmission power, the interference with communication of other wireless terminals occurs. To prevent the interference, the wireless terminal controls the transmission power of the PUCCH.

The LTE specifies two methods for controlling transmission power; open-loop power control; and closed-loop power control (Non Patent Literature 1). The open-loop power control is a method performed when a wireless terminal starts communicating with a radio base station or when a wireless terminal connects with another radio base station by handover and starts communicating with the other radio base station. The wireless terminal performs random access control when starting the communication. For the random access control, the radio base station measures reception power of a preamble transmitted with a physical random access channel (PRACH), and notifies the wireless terminal of the reception power value of the preamble. The wireless terminal estimates a path loss of downlink transmission from a reception power value of the signal transmitted from the radio base station and the transmission power value of the radio base station separately notified by the radio base station. The wireless terminal determines transmission power of an uplink signal by adding a power corresponding to the estimated path loss to the reception power value of the preamble notified by the radio base station.

For the closed-loop power control, a transmission power control (TPC) command explicitly specifying an increase or decrease in the transmission power is transmitted from the radio base station to the wireless terminal after communication is started, such that the transmission power of the wireless terminal is controlled. During the communication with the radio base station, the wireless terminal performs transmission power control according to the closed-loop power control by the radio base station.

CITATION LIST

Non Patent Literatures

Non Patent Literature 1: 3GPP TS 36.213 V14.1.0 (2016-12)

SUMMARY

Technical Problem

What has been studied in Fifth Generation Mobile Communications Systems (5G systems) of the 3GPP is a scheme under which the radio base station communicates with the wireless terminals by using a plurality of beams having directivity (directional beams) formed according to a beam forming technology. In such a radio communication system, a radio base station covers a service area (cell) with a plurality of beams that cover narrow areas. A wireless terminal communicates with the radio base station with any one of the beams transmitted by the radio base station, and when the wireless terminal is moved, the wireless terminal switches from the beam being used for the communication to another beam and continues the communication.

When the beam used for the communication between the wireless terminal and the radio base station is switched, the transmission power control according to the conventional closed-loop power control cannot allow the wireless terminal to perform transmission with a transmission power that matches the post-switching beam. The open-loop power control is the scheme of adjusting uplink transmission power from the wireless terminal on the basis of a path loss estimated from a downlink radio wave transmitted by the radio base station. A problem with such open-loop power control is that the accuracy of adjustment of the transmission powers before and after the beam switching is degraded.

The present invention has been made in view of the above, and an object thereof is to provide a wireless terminal capable of performing transmission power control with high accuracy even when the wireless terminal switches a directional beam used for communication with the radio base station in a radio communication system in which the radio base station covers a service area by using a plurality of directional beams.

Solution to Problem

The present invention provides a wireless terminal comprising: an antenna to receive a plurality of beams formed by a radio base station; and a power control unit to adjust transmission power of an uplink signal transmitted from the antenna to the radio base station after beam switching, on a basis of a reception power difference between a beam used before the beam switching and a beam to be used after the beam switching, the beam switching being switching of a beam used for communication with the radio base station among the beams.

The present invention further provides a transmission power control method at a wireless terminal to switch a beam used for communication with a radio base station among a plurality of beams formed by the radio base station, the transmission power control method comprising: a step of determining whether or not to switch the beam used for communication; when the beam used for communication is to be switched, a step of adjusting transmission power of an uplink signal to be transmitted to the radio base station after the switching, on the basis of a reception power difference between the beam used before the switching and the beam to be used after the switching; and a step of transmitting the uplink signal after the switching, with use of the adjusted transmission power.

The present invention further provides a radio base station comprising: an antenna to simultaneously form a plurality of beams; and a power control unit to select a method for, on a basis of position information on a beam source used before beam switching and position information on a beam source to be used after the beam switching, determining transmission power of an uplink signal to be transmitted by a wireless terminal after the beam switching, the beam switching being switching of a beam used for communication with the wireless terminal among the beams.

The present invention further provides a radio base station comprising: an antenna to simultaneously form a plurality of beams; and a power control unit to obtain reception power of each of the beams on the basis of signals received with the beams, the signals being transmitted by a wireless terminal, and notify the wireless terminal of a difference in the reception power between a beam used before beam switching and a beam to be used after the beam switching, the beam switching being switching of the beam used for communication with the wireless terminal among the beams.

Advantageous Effects of Invention

The wireless terminal, the transmission power control method of the wireless terminal, and the radio base station according to the present invention have the advantageous effect that, when the wireless terminal switches a beam used for communication among a plurality of beams formed for different areas by the radio base station, the post-beam-switching transmission power control is appropriately performed.

BRIEF DESCRIPTION OF DRAWINGS

FIG. 7 is a flowchart illustrating an example of processing by a power control unit of a wireless terminal according to the first embodiment.

FIG. 8 is a sequence diagram illustrating an example of a procedure for transmission power control after beam switching in the radio communication system according to the first embodiment.

FIG. 9A and FIG. 9B illustrate tables illustrating examples of results of measurement of the reception qualities of beams measured by a wireless terminal of the first embodiment.

FIG. 10 is a schematic diagram illustrating an example of beam switching performed by a wireless terminal in the radio communication system according to the first embodiment.

FIG. 11A to FIG. 11C illustrate tables illustrating examples of the relation between the transmission power of a wireless terminal and the reception power of the radio base station in the radio communication system according to the first embodiment.

FIG. 12 is a flowchart illustrating an example of processing of transmission power control performed by a power control unit of a wireless terminal according to a second embodiment.

DESCRIPTION OF EMBODIMENTS

Figure 1:
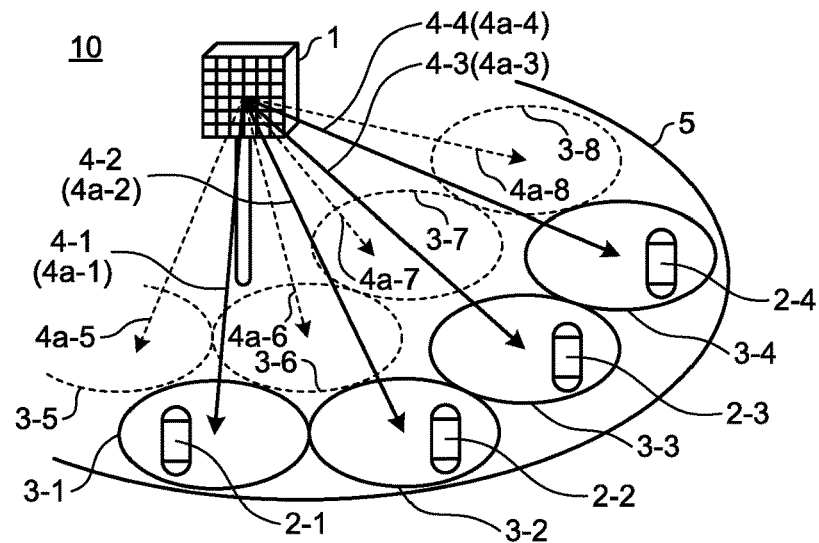
FIG. 1 is a system configuration diagram illustrating an example of a configuration of a radio communication system according to a first embodiment of the present invention.

Embodiments of the present invention will be described below with reference to the drawings. In the drawings referred to below, the same or corresponding parts will be represented by the same reference numerals. Note that the present invention is not limited to the embodiments.

First Embodiment

In a radio communication system according to a first embodiment of the present invention, a radio base station forms a plurality of beams that cover different areas (coverage areas), and a service area in which the radio base station provides services is constituted by a set of coverage areas of the beams formed by the radio base station. A wireless terminal within the service area communicates with the radio base station with beams associated with the coverage area in which the wireless terminal is located. While a mobile communication system will be described as an example of the radio communication system in the description below, the application of the present invention may be any radio communication system in which a radio base station forms a plurality of beams, and is not limited to a mobile communication system.

FIG. 1 is a block diagram illustrating an example of the radio communication system according to the present embodiment. In FIG. 1, a radio communication system 10 includes a radio base station 1 and wireless terminals (hereinafter also referred to as UEs: user equipment) 2-1, 2-2, 2-3, and 2-4. Where the UEs 2-1, 2-2, 2-3, and 2-4 need not be individually referred to, these UEs will be hereinafter referred to as UEs 2. This is also applicable to other components.

The radio base station 1 is capable of simultaneously forming four beams 4-1 to 4-4 with different orientations. The service area 5 of the radio base station 1 is made up of eight areas 3-1 to 3-8. In the radio communication system of FIG. 1, beams 4 are simultaneously formed for up to four areas of the eight areas 3, and the orientations of the beams 4 are switched, so that communication services are provided in all the areas 3 within the service area 5. Note that the beam forming performed by the radio base station 1 may include beam forming at in signal reception in addition to beam forming at signal transmission.

While FIG. 1 illustrates an example in which the four UEs 2 are provided, the number of UEs 2 is not limited to four. The UEs 2 are mobile terminals, and the number of UEs 2 that can communicate with the radio base station 1 increases or decreases with the movement of the UEs 2. Thus, the number of UEs 2 of the radio communication system of the present embodiment is not constant. In addition, the number of areas 3 of the service area 5 is not limited to eight, and the number of beams 4 that can be simultaneously formed is not limited to four. Furthermore, two or more areas 3 may overlap, and a UE 2 may communicate with the radio base station by using a plurality of beams.

FIG. 1 illustrates the radio base station 1 forming beams 4-1, 4-2, 4-3, and 4-4 for areas 3-1, 3-2, 3-3, and 3-4, respectively. The UEs 2-1, 2-2, 2-3, and 2-4, which are located in the areas 3-1, 3-2, 3-3, and 3-4, respectively, communicate with the radio base station 1 by using the beams 4 formed for the areas 3-1, 3-2, 3-3, and 3-4. Note that beams 4-1, 4-2, 4-3, and 4-4 are formed for areas 3-5, 3-6, 3-7, and 3-8 in a time division manner with those for the areas 3-1, 3-2, 3-3, and 3-4. The beam 4 formed for the area 3-1 will be hereinafter referred to as an area beam 4a-1, the beam 4 formed for the area 3-8 will be hereinafter referred to as an area beam 4a-8, and so on.

Figure 2:
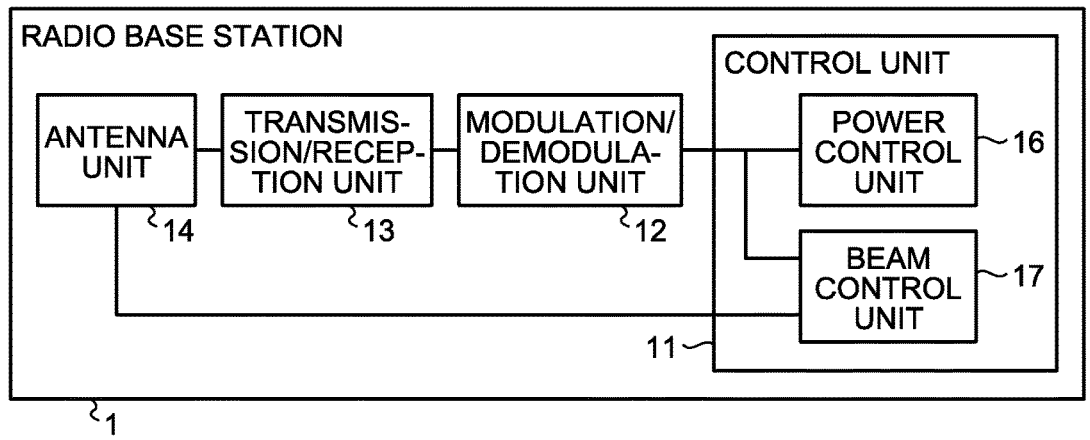
FIG. 2 is a block diagram illustrating an example of a functional configuration of a radio base station according to the first embodiment.

FIG. 2 is a block diagram illustrating an example of a functional configuration of the radio base station 1 according to the present embodiment. The radio base station 1 includes a control unit 11, a modulation/demodulation unit 12, a transmission/reception unit 13, and an antenna unit 14.

The control unit 11 includes a power control unit 16, and a beam control unit 17. The power control unit 16 is a block that controls transmission power of an uplink signal that a UE 2 transmits to the radio base station 1. The power control unit 16 generates information indicating an increase or decrease in transmission power of an uplink signal of the UE 2, and outputs the generated information as transmission data to the modulation/demodulation unit 12. The information is transmitted with a downlink signal to the UE 2. Note that the information indicating the increase or decrease in transmission power of an uplink signal of a UE 2 is information that can be obtained by an existing method for controlling power of an uplink signal. The information is, for example, information on transmission power control (TPC) specified in a 3GPP standard or information on a reception power difference that is a difference between a measured value of a signal received on its own and a target value. Note that the control unit 11 may have other functions performed by a base station for radio communication, such as processing of other communication data between the radio base station 1 and UEs 2 and management of radio resources.

The beam control unit 17 controls beam forming performed by the antenna unit 14 in every beam forming period. Under the control of the beam control unit 17, a beam 4 formed by the antenna unit 14 is directed toward an UE 2 that will communicate with the base station. Note that the beam forming period is a time that is a unit on the basis of which the orientation of the beam 4 is switched. More specifically, the beam control unit 17 calculates information for controlling the amplitude and the phase of a radio wave emitted from each of a plurality of antenna elements of the antenna unit 14 by using a beam forming technology, and inputs the information to the antenna unit 14. The beam forming technology is a technology of controlling the orientation and the shape of a beam by adjusting the phase and the amplitude of a radio wave emitted by each of a plurality of antenna elements. The method of control using the beam forming technology performed by the beam control unit 17 may be any method conforming to the communication standard applied to the radio communication system 10, and specific algorithms are not particularly limited.

The beam control unit 17 also controls the antenna unit 14 so that beams 4 are periodically formed for each area 3, so as to locate the positions where UEs 2 are present. A UE 2 measures the signal strength of a received beam 4, and transmits the measurement result with an uplink signal to the radio base station 1. The beam control unit 17 receives, from the modulation/demodulation unit 12, the measurement result transmitted from the UE 2 as received data. The beam control unit 17 is capable of locating the position where the UE 2 is present on the basis of the received measurement result and the orientation of the beam 4 associated with the measurement result. For the radio communication system of the example of FIG. 1, the four beams 4 can be simultaneously formed; thus, beams 4 are first formed for four areas 3 and beams 4 for the remaining areas 3 are then formed, so that the beams 4 for the eight areas 3 are formed.

Note that the orientations and shapes of the beams 4 for the eight areas 3 for which the antenna unit 14 can form beams are preset, and the beam control unit 17 holds information indicating the phase and the amplitude of a radio wave for forming a beam 4 for each of the eight areas 3. Upon determining an area 3 for which a beam 4 is to be formed, the beam control unit 17 inputs, to the antenna unit 14, the information indicating the phase and the amplitude for forming the beam 4 for the area 3.

The modulation/demodulation unit 12 modulates transmission data input from the control unit 11, by a modulation method such as quadrature phase shift keying (QPSK) or 64-quadrature amplified modulation (QAM), and inputs the modulated data, that is, a baseband signal to the transmission/reception unit 13. The modulation/demodulation unit 12 also demodulates a baseband signal input from the transmission/reception unit 13, and inputs the demodulated data as received data to the control unit 11. The demodulation method performed by the modulation/demodulation unit 12 corresponds to a modulation method performed by the UE 2 for transmission, which is known.

The transmission/reception unit 13 converts the baseband signal, which is a digital signal, into an analog signal, converts the analog signal into a signal of a radio frequency band, that is, a radio signal, and inputs the radio signal to the antenna unit 14. The transmission/reception unit 13 also converts the frequency of a radio signal input from the antenna unit 14, into a baseband frequency, and inputs, to the modulation/demodulation unit 12, a baseband signal obtained by analog-to-digital conversion of the signal having the frequency converted.

The antenna unit 14 is an antenna for forming a plurality of beams 4 with different orientations in accordance with control from the beam control unit 17. The antenna unit 14 transmits a radio signal input from the transmission/reception unit 13, with the formed beam 4. The antenna unit 14 inputs a received radio signal to the transmission/reception unit 13. In transmitting a radio signal, the antenna unit 14 forms the beam with the beam control unit 17 controlling the amplitudes and phases of radio waves emitted by a plurality of antenna elements. The forming of the beam upon reception of a radio signal is performed with the beam control unit 17 adjusting the amplitudes and phases of radio waves received by the antenna elements.

Figure 3:
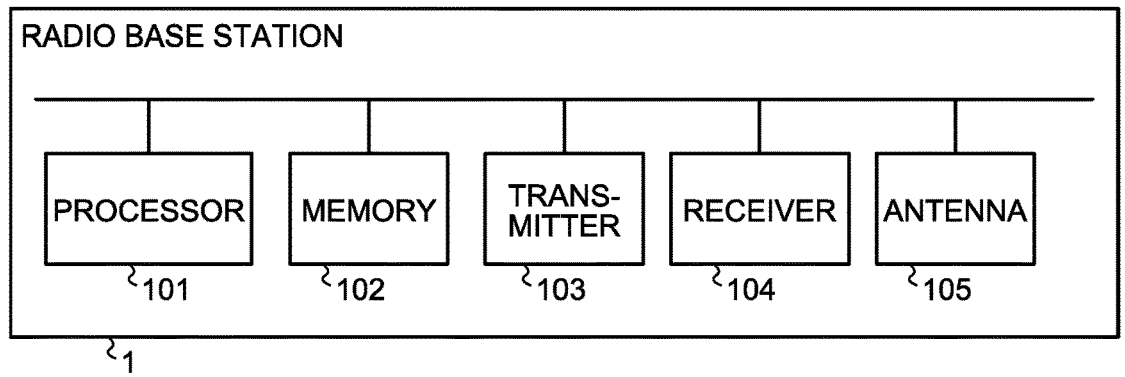
FIG. 3 is a block diagram illustrating an example of a hardware configuration of the radio base station according to the first embodiment.

FIG. 3 is a block diagram illustrating an example of a hardware configuration of the radio base station 1 according to the present embodiment. The radio base station 1 includes a processor 101, a memory 102, a transmitter 103, a receiver 104, and an antenna 105. The processor 101 may be a circuit that executes programs, such as a general-purpose processor or a digital signal processor (DSP), or a circuit such as an application specific integrated circuit (ASIC) or a system large scale Integration (LSI). The memory 102 is a volatile or nonvolatile semiconductor memory such as a random access memory (RAM), a read only memory (ROM), or a flash memory, or a storage device such as a magnetic disk, or a hard disk. In a case where the processor 101 executes programs, the programs are stored in the memory 102. The control unit 11 and the modulation/demodulation unit 12 illustrated in FIG. 2 are implemented by the processor 101 and the memory 102 illustrated in FIG. 3.

The transmitter 103 and the receiver 104 are dedicated circuits. The transmitter 103 and the receiver 104 correspond to the transmission/reception unit 13. The transmission/reception unit 13 performs transmission-related processing implemented by the transmitter 103. The transmission/reception unit 13 performs reception-related processing implemented by the receiver 104. Note that FIG. 3 presents an example of a hardware configuration, and at least one part of the functions of the transmission/reception unit 13 may be implemented by programs.

Figure 4:
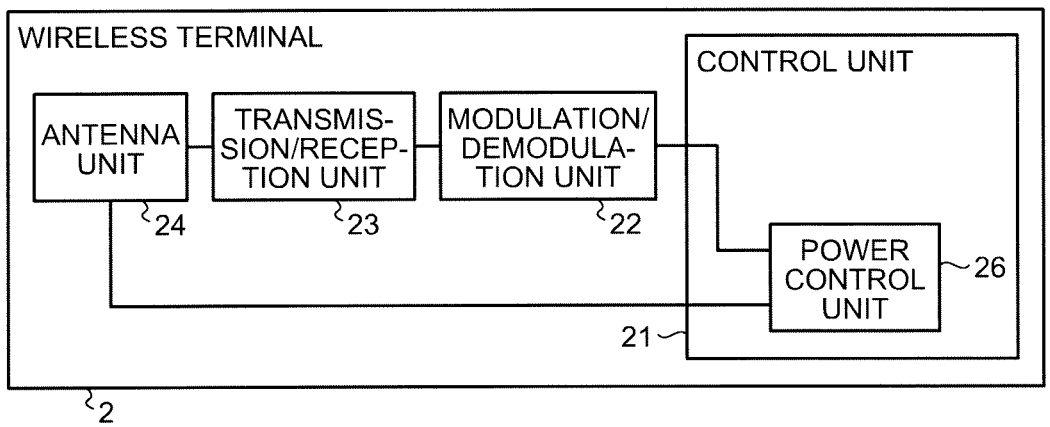
FIG. 4 is a block diagram illustrating an example of a functional configuration of a wireless terminal according to the first embodiment.

FIG. 4 is a block diagram illustrating an example of a functional configuration of a UE 2 according to the present embodiment. The UE 2 includes a control unit 21, a modulation/demodulation unit 22, a transmission/reception unit 23, and an antenna unit 24.

The control unit 21 includes a power control unit 26. The power control unit 26 determines the transmission power of a radio wave that is to be transmitted from the antenna unit 24. The control unit 21 notifies the antenna unit 24 of information on the determined transmission power. The method for determining the transmission power will be described later. The power control unit 26 also has a function of outputting, to the modulation/demodulation unit 22, transmission data that is a result of measurement of the reception power of each of beams 4 transmitted from the radio base station 1. Note that the control unit 21 may have other functions performed by a terminal for radio communication, such as processing of other communication data between the UE 2 and the radio base station 1 and management of radio resources.

The modulation/demodulation unit 22 modulates the transmission data input from the control unit 21, by a modulation method such as QPSK or 64QAM, and inputs the modulated data, that is, a baseband signal to the transmission/reception unit 23. The modulation/demodulation unit 22 also demodulates data input from the transmission/reception unit 23, and inputs the demodulated received data to the control unit 21. The demodulation method performed by the modulation/demodulation unit 22 corresponds to the modulation method performed by the radio base station 1 for transmission, which is known.

The transmission/reception unit 23 converts the baseband signal, which is a digital signal, into an analog signal, converts the analog signal into a signal of a radio frequency band, that is, a radio signal, and inputs the radio signal to the antenna unit 24. The transmission/reception unit 23 also converts the frequency of a radio signal input from the antenna unit 24, into a baseband frequency, and inputs, to the modulation/demodulation unit 22, a baseband signal obtained by analog-to-digital conversion of the signal having the frequency converted. The transmission/reception unit 23 also has a function of measuring the reception power of each of beams 4 transmitted from the radio base station 1, which is not illustrated in FIG. 4.

The antenna unit 24 transmits a radio wave that is a radio signal input from the transmission/reception unit 23. The antenna unit 24 inputs a received radio signal to the transmission/reception unit 23. In transmitting a radio signal, the antenna unit 24 also adjusts the transmission power of a radio wave in accordance with the information of the transmission power provided from the control unit 21.

Figure 5:
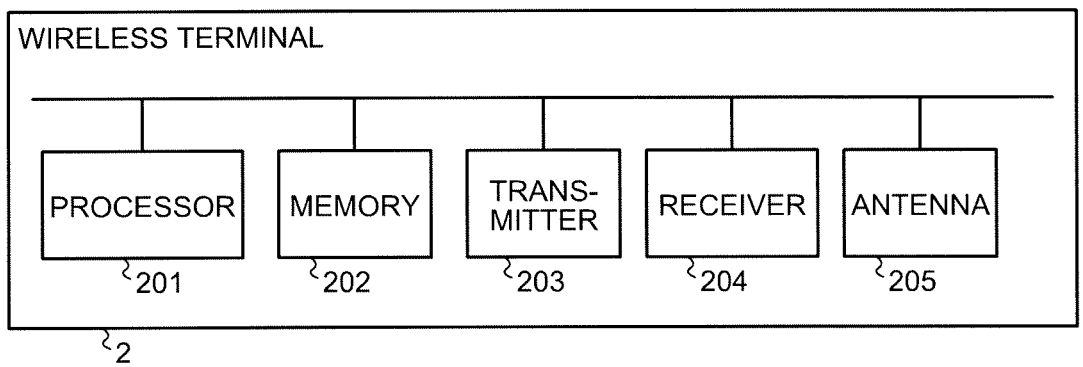
FIG. 5 is a block diagram illustrating an example of a hardware configuration of the wireless terminal according to the first embodiment.

FIG. 5 is a block diagram illustrating an example of a hardware configuration of a UE 2 according to the present embodiment. The UE 2 includes a processor 201, a memory 202, a transmitter 203, a receiver 204, and an antenna 205. The processor 201, the memory 202, the transmitter 203, and the receiver 204 are similar to the processor 101, the memory 102, the transmitter 103, and the receiver 104, respectively, of the radio base station 1. The antenna 205 may be a directional antenna like the antenna 105, or may be a non-directional antenna.

The control unit 21 and the modulation/demodulation unit 22 illustrated in FIG. 4 are implemented by the processor 201 and the memory 202 illustrated in FIG. 5. The transmission/reception unit 23 is implemented by the transmitter 203 and the receiver 204. Note that at least one part of the functions of the transmission/reception unit 23 may be implemented by programs executed by the processor 201.

Figure 6:
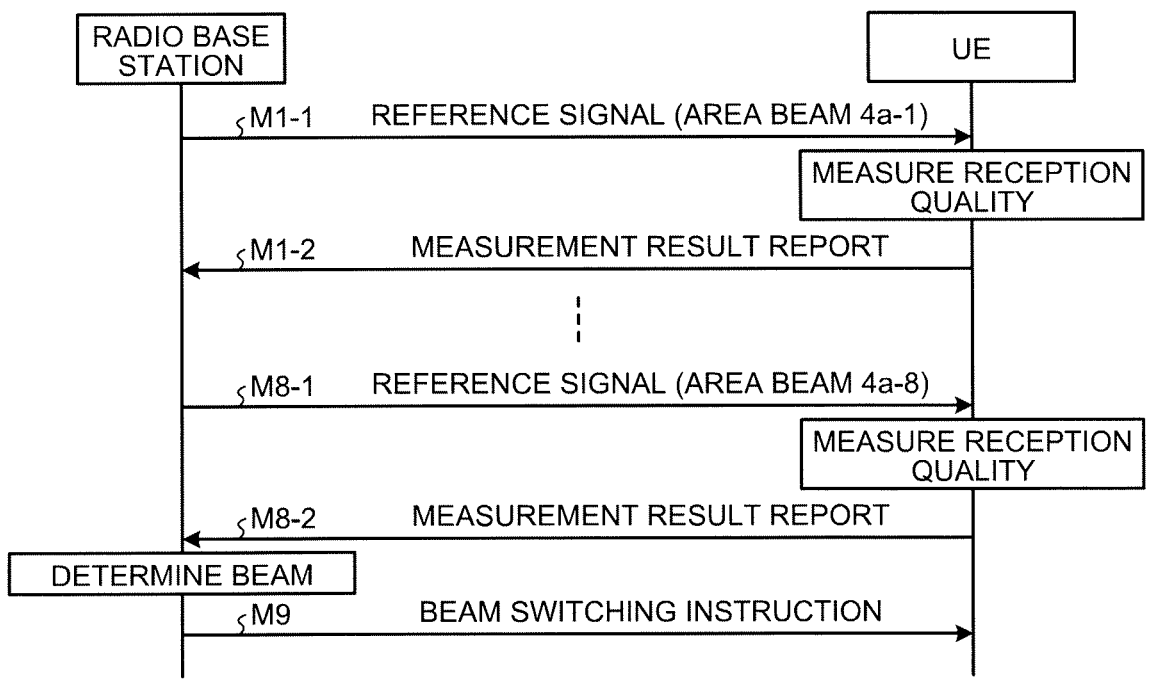
FIG. 6 is a sequence diagram illustrating an example of a procedure for beam switching in the radio communication system according to the first embodiment.

A specific example of switching of beams between the radio base station 1 and the UEs 2 will now be described with reference to the system illustrated in FIG. 1. The beam switching is a switching process of determining what beam 4 formed for what area 3 should be used for communication between the radio base station 1 and a UE 2. FIG. 6 is a sequence diagram illustrating the procedure performed among devices for the beam switching in the present embodiment. In the system of FIG. 1, as described above, area beams 4a-1 to 4a-8 are formed for the areas 3-1 to 3-8, respectively. The radio base station 1 transmits, with an area beam 4a-1, a reference signal (RS) used for measurement of signal strength (M1-1). The UE 2 measures the signal strength of the reference signal transmitted by the radio base station 1, and reports, to the radio base station 1, the measurement result as the reception quality of the area beam 4a-1 (M1-2). Note that the target signals, the signal strengths of which are to be measured, are not limited to reference signals. For example, signals for normal communication can be measured.

Similar processes are sequentially performed for each of the areas 3. When the UE 2 reports the result of measurement of the reference signal transmitted with the area beam 4a-8 formed for the area 3-8 (M8-1 and M8-2), the radio base station 1 determines, on the basis of the reports on the reception quality received from the UE 2, that an area beam providing the highest reception quality in the area beams 4a-1 to 4a-8 will be used for communication with the UE 2. When the area beam 4a is to be changed, the radio base station 1 then transmits a beam switching instruction to the UE 2 (M9). For example, when the area beam 4a-2, which is a beam 4 formed for the area 3-2, has the highest reception quality, the radio base station 1 instructs the UE 2 to switch the beam to the area beam 4a-2 by means of the beam switching instruction. The radio base station 1 can perform beam switching with the movement of the UE 2 by periodically transmitting a reference signal with a beam 4 formed for each area.

For the system illustrated in FIG. 1, the four beams can be simultaneously formed; thus, processing for, for example, the area beams 4a-1 to 4a-4, may be performed at the same timing. In the present invention, the procedure for the beam switching are not limited to the method described above, and the beam switching may be performed in a manner different from that described above within a range consistent with transmission power control described below.

Next, operation of the transmission power control according to the present embodiment will be explained. FIG. 7 is a flowchart illustrating an example of the procedure for transmission power control in a UE 2 of the present embodiment. A beam 4 transmitted from the radio base station 1 is processed by the antenna unit 24, the transmission/reception unit 23, and the modulation/demodulation unit 22 in that order in an UE 2 and input to the control unit 21. The power control unit 26 of the control unit 21 determines whether or not a signal for measurement of the signal strength of a signal input from the modulation/demodulation unit 22 is received from the radio base station 1 (step S1-1).

When a signal for measurement of the signal strength is received (step S1-1 Yes), the power control unit 26 of the UE 2 measures the reception quality for the received signal, and reports the measured reception quality to the radio base station 1 (step S1-2). The power control unit 26 stores the reported reception quality. Note that the reception quality is processed by the modulation/demodulation unit 22, the transmission/reception unit 23, and the antenna unit 24 in that order, and transmitted wirelessly to the radio base station 1.

Subsequently, the power control unit 26 of the UE 2 determines whether or not to perform beam switching (step S1-3). In the example of the sequence in FIG. 6, the power control unit 26 determines whether or not a beam switching instruction is received from the radio base station 1. When beam switching is to be performed (step S1-3 Yes), the power control unit 26 obtains, from the reception power (P0) of the area beam 4a before the beam switching and the reception power (P1) of the area beam 4a after the beam switching, a reception power difference ΔP between the pre-beam switching and the post-beam-switching by formula (1) below (step S1-4). Note that acquisition of the reception powers P0 and P1 will be described later.

[Formula 1]

$$\Delta P = P1 - P0 \quad (1)$$

Subsequently, the power control unit 26 obtains, by formula (2) below, the transmission power TxP of the UE 2 after the beam switching (step S1-5). Note that TxP on the left side of formula (2) represents the transmission power of the UE 2 after the beam switching, and TxP on the right side represents the transmission power of the UE 2 set before the beam switching.

[Formula 2]

$$TxP = TxP - \Delta P \quad (2)$$

Assume herein that the transmission power of a physical uplink control channel (PUCCH) transmitted first after switching is set by formula (2). In addition, from the transmission of the post-beam-switching first PUCCH and onward, the UE 2 controls the transmission power by closed-loop power control of the related art.

Next, the acquisition of P0 and P1 used in step S1-4 described above will be explained with reference to a sequence diagram illustrated in FIG. 8. FIG. 8 is a diagram illustrating an example of a sequence of communication between the radio base station 1 and the UE 2 before and after beam switching. FIG. 8 is based on the assumption that normal communication from the radio base station 1 to the UE 2 occurs before beam switching illustrated by way of example in FIG. 6. Assume here that the reception quality is also measured for a signal for normal communication. In addition, reception quality refers to the signal strength (reception power) of a received beam, and the reception quality is higher as the reception power is higher.

In FIG. 8, a signal for normal communication is transmitted from the radio base station 1 to the UE 2 (M0-1). Assume here that the area beam 4a-1 formed for the area 3-1 is used for the communication. The power control unit 26 of the UE 2 measures the reception power of the received area beam 4a-1. Thereafter, the reception power of each area beam 4a is measured in accordance with the procedure illustrated in FIG. 6. The measured reception powers are held in the power control unit 26. In addition, when a signal for communication is received while the UE 2 is measuring the reception power of a reference signal, the UE 2 also measures the reception power thereof (M0-2).

Upon receiving a beam switching instruction such as the instruction to switch to, for example, the area beam 4a-2 (M9), the UE 2 performs the beam switching, and then performs transmission power control on a signal to be transmitted on the uplink, as is illustrated in the aforementioned flowchart. Finally, the UE 2 transmits the post-switching uplink signal (M10). In this process, the reception powers measured for the area beams 4a received in accordance with the procedure from M1-1 to M8-1 include the reception powers associated with the beam before the switching and with the beam after the switching, and these associated reception powers can be used as P0 and P1, respectively.

In addition, when signals for normal communication are received before the switching (M0-1, M0-2) and the reception powers thereof are measured, the reception powers can be used as P0. Furthermore, when a signal for normal communication is received after the beam switching (M0-3) and the reception power thereof is measured, the reception power can be used as P1. Furthermore, the reception power of an area beam 4a for transmitting a beam switching instruction can be used as P0.

FIG. 9A and FIG. 9B illustrate tables illustrating an example of results of measurements of the reception qualities of the respective area beams 4a held by the power control unit 26 of the UE 2 according to the present embodiment. FIG. 9A illustrates results of measurement obtained when the radio base station 1 transmits a reference signal at a given timing, and FIG. 9B illustrates results of measurement at a measurement timing subsequent to that of FIG. 9A. Assume that the UE 2 communicate with the radio base station 1 with the area beam 4a-3 at the timing of FIG. 9A. The measurement results illustrated in FIG. 9A show that the reception power of the area beam 4a-3, that is, the reception quality of the area beam 4a-3 is the highest; therefore, the communication with the area beam 4a-3 is continued without the beam switching being performed. When the measurement results of FIG. 9B are obtained at the next measurement timing, the reception power of the area beam 4a-4 is the highest; therefore, the UE 2 performs beam switching from the area beam 4a-3 to the area beam 4a-4.

FIG. 10 illustrates an example of beam switching in correspondence to FIG. 9B. FIG. 10 illustrates the UE 2 located at the timing of FIG. 9B at the boundary between the area 3-3 for which the area beam 4a-3 is formed and the area 3-4 for which the area beam 4a-4 is formed. The reception power of the UE 2 is determined by path loss and the transmitting antenna gain of the radio base station 1. Because the reception position of the UE 2 does not change between the pre-beam-switching and the post-beam-switching at the timing of FIG. 9B, the path loss does not change between the pre-beam-switching and the post-beam-switching. The transmitting antenna gain of the radio base station 1 tends to decrease as a UE 2 is farther from the center of an area 3. When the area beam 4a-4 is detected as the area beam 4a providing a higher reception power at the timing of FIG. 9B, it follows that the UE 2 is located at a position where the transmitting antenna gain of the area beam 4a-4 is higher than that of the area beam 4a-3, given that the path loss is the same.

FIG. 11A and FIG. 11B illustrate tables illustrating examples of the transmission power at a UE 2 of the present embodiment. Assume that the transmitting antenna gain and the receiving antenna gain of the radio base station 1 are equal. FIG. 11A, which corresponds to the measurement timing of FIG. 9A, illustrates the transmission power when communication is performed using the area beam 4a-3. During communication with the radio base station 1 before the beam switching, the UE 2 controls the transmission power by closed-loop power control of the related art. Assume that a target value of the reception power at the radio base station 1 is −50 [dBm]. In this case, when the path loss is 90 [dB] and the receiving antenna gain of the area beam 4a-3 is 20 [dB], an appropriate transmission power TxP of the UE 2 is determined to be 20 [dBm] on the basis of formula (3) below. The radio base station 1 controls the transmission power of the UE 2 by closed-loop power control so that the transmission power becomes the obtained transmission power value of the UE 2.

[Formula 3]

$$-50=-90+20+TxP \quad (3)$$

FIG. 11B illustrates the relation among the transmission power TxP of the UE 2, the path loss, and the receiving antenna gain of the area beam 4a-4 when the transmission power TxP of the UE 2 is determined by formula (2) as a result of the beam switching performed on the basis of the measurement results in FIG. 9B. As explained with reference to FIG. 10, the receiving antenna gain (transmitting antenna gain) of the area beam 4a-4 from the radio base station 1 is higher than that of the area beam 4a-3 in FIG. 11A. The reception power difference ΔP between the reception power of the area beam 4a-3 before the switching and the reception power of the area beam 4a-4 after the switching is 10 [dBm]. The downlink reception power difference of 10 [dBm] is subtracted from the transmission power of 20 [dBm] before the switching in accordance with formula (2), such that the transmission power TxP of the UE 2 after the beam switching equals 10 [dBm]. In this case, the reception power of the transmission signal from the UE 2 at the radio base station 1 is obtained as shown formula (4) below, which indicates that the transmission power of the UE 2 is an appropriate value.

[Formula 4]

$$-90+30+(TxP=10)=-50 \quad (4)$$

FIG. 11C illustrates an example of the transmission power of the UE 2 after the beam switching in a case where the transmission power control in the present embodiment is not used. When the transmission power value before the beam switching is continuously used, the reception power of the transmission signal from the UE 2 at the radio base station 1 is shown in below formula (5) where the transmission power TxP is 20 [dBm], the path loss is 90 [dB], and the receiving antenna gain of the area beam 4a-4 is 30 [dB]. Formula (5) means that the reception power of the transmission signal from the UE 2 at the radio base station 1 is an excessive power larger than the target value of the reception power of the radio base station 1 by 10 [dBm].

[Formula 5]

$$-90+30+(TxP=20)=-40 \quad (5)$$

As described above, the wireless terminal according to the present embodiment obtains a difference between the reception power of a downlink beam used for communication before the beam switching and the reception power of a downlink beam used for communication after the beam switching, and adjusts the transmission power after the beam switching on the basis of the obtained difference. As a result, it becomes possible to perform, with high accuracy, transmission power control on the wireless terminal after the beam switching. While the path loss and the antenna gain are described separately from each other in the explanation above, these values cannot in fact be obtained separately. These values, however, are described separately from each other for the sake of explanation that, when beam switching is performed, the path loss plus (+) the receiving antenna gain of the beam selected by the beam switching is always larger. Even though these values cannot be obtained separately from each other, the method of the present invention is not affected.

Second Embodiment

Next, a description will be made as to transmission power control of a wireless terminal in a case where the position of a beam source is changed between before the pre-beam-switching and the post-beam-switching. In a case where a plurality of antennas are connected with a radio base station and the installation positions of the antennas are different from each other, for example, the antenna position may change between the pre-beam-switching and the post-beam-switching even within the service area of one radio base station.

A radio communication system 10 in the present embodiment has a configuration similar to that in the first embodiment. In addition, a wireless terminal 2 and a radio base station 1 of the radio communication system 10 also have configurations similar to those in the first embodiment. Hereinafter, the operation of transmission power control performed by a wireless terminal 2 in the present embodiment will be explained focusing on the difference from the first embodiment. Note that, in the present embodiment that, when transmitting an RS, the radio base station 1 also transmits radio-base-station position information together with the RS. The radio-base-station position information is position information on the beam source.

FIG. 12 is a flowchart illustrating an example of the procedure for transmission power control performed by a power control unit 26 of an UE 2 according to the present embodiment. The processing in steps S1-1, S1-2, and S1-3 is as explained in the first embodiment. When determining to perform beam switching in step S1-3, the power control unit 26 determines, on the basis of the radio-base-station position information transmitted with the RS, whether or not the radio-base-station position information will be changed between the pre-beam-switching and the post-beam-switching (step S2-1). When the radio-base-station position information is not to be changed (step S2-1 No), the power control unit 26 performs the processing in steps S1-4 and S1-5 described in the first embodiment.

When determining in step S2-1 that the radio-base-station position information is to be changed (step S2-1 Yes), the power control unit 26 determines, on the basis of the beam 4 with which the RS is received, the transmission power of the UE 2 from the path loss value and the reception power target value of an uplink signal by the open-loop power control method of the related art (step S2-2). The reception power target value of the uplink signal is notified by the radio base station 1.

As described above, the wireless terminal according to the present embodiment switches the transmission power control method, depending on whether or not the position of the beam source is to be changed between the pre-beam-switching and the post-beam-switching. When the position of the source is to be changed, the wireless terminal performs transmission power control in accordance with the open-loop power control. When the position is not to be changed, the wireless terminal performs transmission power control similar to that in the first embodiment. That is, the wireless terminal can transmit an uplink signal with an appropriate transmission power even when the position of the radio base station differs between the pre-beam-switching and the post-beam-switching.

While the above description gives an example in which the position information on the radio base station and the RS are transmitted together, the position information on the radio base station for each beam may be provided to all terminals with use of a broadcast channel. Alternatively, the position information on the radio base station for each beam may be provided to each terminal with use of an individual signal for each terminal.

Third Embodiment

While the second embodiment provides a mode in which the wireless terminal selects and switches the transmission power control method after beam switching depending on whether or not the position of the beam source is to be changed between the pre-beam-switching and the post-beam-switching, the radio base station may select the transmission power control method and notify the wireless terminal of the same. In a third embodiment, a description will be made as to a mode in which the radio base station selects the transmission power control method. A radio communication system 10 of the present embodiment has a configuration similar to that in the second embodiment, and a radio base station 1 and a wireless terminal 2 also have configurations similar to those in the second embodiment. Hereinafter, the operation of transmission power control performed by a wireless terminal 2 in the present embodiment will be explained focusing on the difference from the second embodiment. Note that, in the present embodiment, the radio base station 1 need not transmit the radio-base-station position information that is the position information on the beam source.

Figure 13:
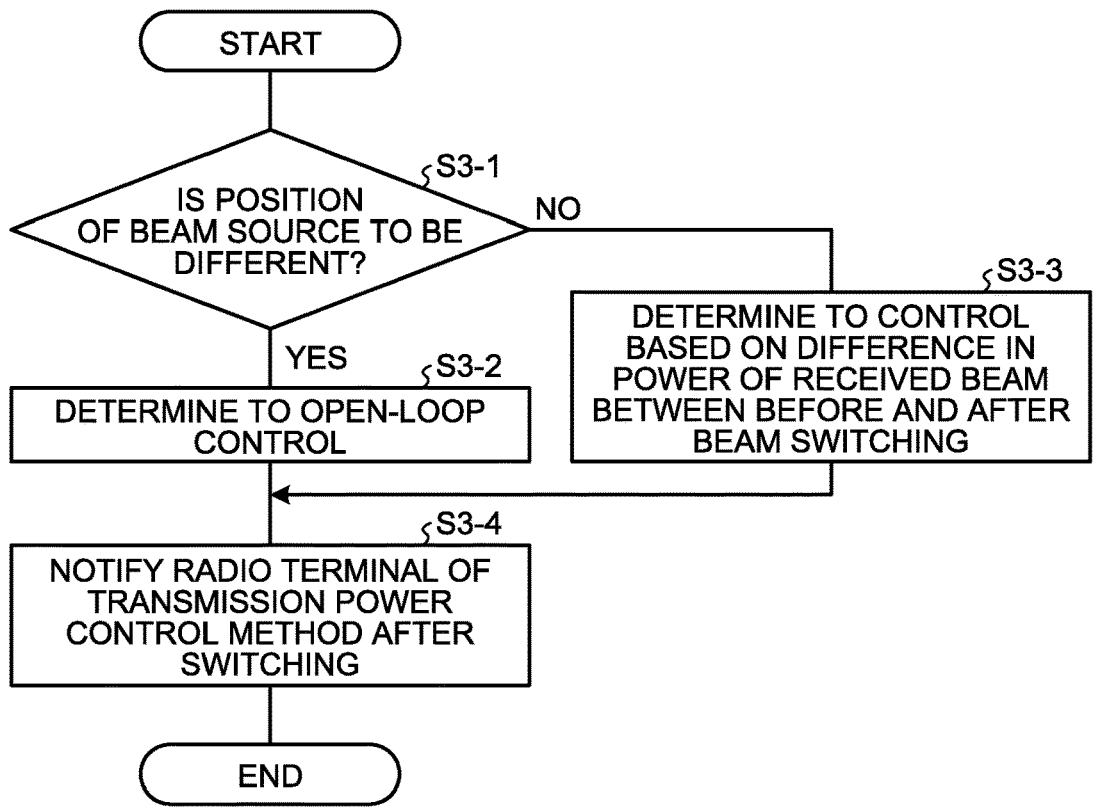
FIG. 13 is a flowchart illustrating an example of processing of transmission power control performed by a power control unit of a radio base station according to a third embodiment.

FIG. 13 is a flowchart illustrating an example of the procedure for selecting transmission power control performed by a power control unit 16 of the radio base station 1 according to the present embodiment. The processing illustrated in FIG. 13 is performed when the radio base station makes the beam determination in the sequence diagram of FIG. 8 that the area beam 4a is to be changed. The power control unit 16 determines whether or not the position of the beam source is to be changed between the pre-beam-switching and the post-beam-switching (step S3-1). Note that the radio base station 1 holds in advance the position of the source of each beam 4a. When the position of the beam source is to be changed (step S3-1 Yes), the post-beam-switching transmission power control method at the UE 2 is determined to be the open-loop power control (S3-2). In contrast, when the position of the beam source is not to be changed (step S3-1 No), the post-beam-switching transmission power control method at the UE 2 is determined to be the method based on the difference in the power of the received beam between the pre-beam-switching and the post-beam-switching as described in the first embodiment (S3-3).

The power control unit 16 then notifies the UE 2 of the determined transmission power control method (S3-4). Note that the UE 2 is notified of the determined transmission power control method via the modulation/demodulation unit 12, the transmission/reception unit 13, and the antenna unit 14 during the normal radio communication processing. The transmission power control method may be notified together with transmission of a beam switching instruction (M9). The UE 2 may perform operation similar to that in the second embodiment except that the UE 2 performs the post-beam-switching transmission power control by the transmission power control method specified by the radio base station 1.

As described above, according to the present embodiment, on the basis of whether or not the position of the beam source is to be changed between the pre-beam-switching and the post-beam-switching, the radio base station selects the post-beam-switching transmission power control method at the wireless terminal. The radio base station selects the transmission power control according to the open-loop power control when the position of the source is to be changed, and the transmission power control similar to that in the first embodiment when the position is not to be changed. The radio base station notifies the wireless terminal of the selected power control method. As a result, advantageous effects similar to those of the second embodiment are produced, and the radio-base-station position information need not be provided to wireless terminals unlike the second embodiment.

Fourth Embodiment

Next, a description will be made as to the post-beam-switching transmission power control of a wireless terminal in a radio communication system in which the wireless terminal transmits a signal for measurement to a radio base station, and the radio base station receives the signal for measurement transmitted from the wireless terminal with a formable reception beam for beam switching. The radio communication system 10 of the present embodiment has a configuration similar to that in the first embodiment, and the radio base station 1 and the wireless terminal 2 also have configurations similar to those in the first embodiment. Hereinafter, the operation according to the present embodiment will be explained focusing on the difference from the first embodiment. Note that the radio base station 1 of the present embodiment performs both of beam forming for transmission and beam forming at reception, and beams 4 or area beams 4a refer to both transmission beams and received beams.

Figure 14:
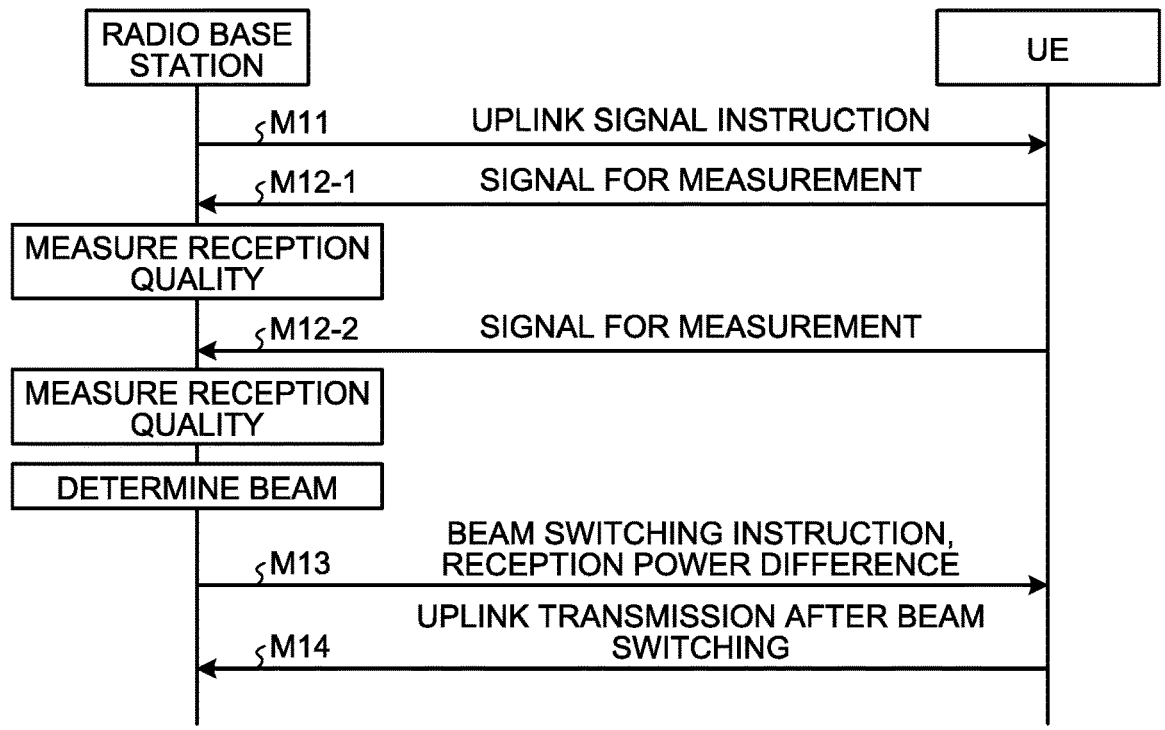
FIG. 14 is a sequence diagram illustrating an example of a procedure for post-beam-switching transmission power control in a radio communication system according to a fourth embodiment.

FIG. 14 is a sequence diagram illustrating an example of the procedure for beam switching performed by the radio base station 1 and the wireless terminal 2 in the present embodiment. The power control unit 16 of the radio base station 1 first transmits an uplink signal instruction to the UE 2 (step M11). The uplink signal instruction is a signal for notifying, for example, the transmission timing at which the UE 2 transmits to the radio base station 1 a signal for measurement, the number of transmissions, and the like. For the radio communication system 10 illustrated in FIG. 1, for example, the radio base station 1 covers eight areas 3 by four beams 4 that can be generated simultaneously. The radio base station 1 thus determines timings including a first timing at which the radio base station 1 forms area beams 4a for four areas 3 (the area 3-1, the area 3-2, the area 3-3, and the area 3-4, for example) and a second timing at which the radio base station 1 forms area beams 4a for the remaining four areas 3. The radio base station notifies the UE 2, by an uplink signal instruction, that the UE 2 transmits signals for measurement at the first and second timings.

With formable area beams 4a, the radio base station 1 receives the signals for measurement transmitted by the UE 2. The signals for measurement transmitted by the UE 2 are processed by the antenna unit 14, the transmission/reception unit 13, and the modulation/demodulation unit 12, and the power control unit 16 measures the reception power as the reception quality of each of the area beams 4a on the basis of the processing results. The power control unit 16 of the radio base station 1 then performs determination about beam switching on the basis of the measured reception qualities. For example, the power control unit 16 determines that an area beam 4a providing the highest reception quality is to be used for communication with the UE, and notifies the UE 2 of a beam switching instruction when beam switching is need (M13). Together with the beam switching instruction, then, the power control unit 16 notifies the UE 2 of the reception power difference between the pre-beam-switching area beam 4a and the post-beam-switching area beam 4a. Note that the reception power difference can be obtained from the reception powers measured for the signals for measurement transmitted by the UE 2.

After the beam switching, the UE 2 determines the transmission power of uplink transmission after beam switching on the basis of the reception power difference notified in the procedure of M13, and performs uplink transmission (M14).

Figure 15:
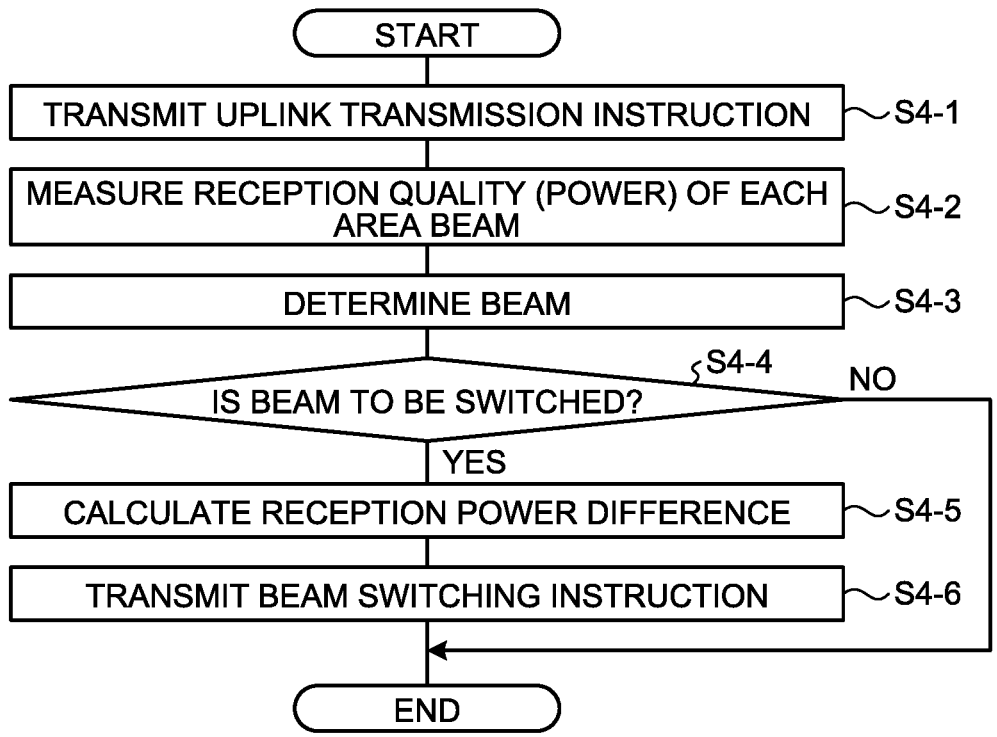
FIG. 15 is a flowchart illustrating an example of processing by a power control unit of a radio base station according to the fourth embodiment.

A flowchart of FIG. 15 illustrates an example of a process performed by the power control unit 16 of the radio base station 1, the process corresponding to the sequence illustrated in FIG. 13. The power control unit 16 first transmits an uplink signal instruction to the UE 2 (step S4-1). Subsequently, the power control unit 16 receives a signal for measurement transmitted from the UE 2, with all of formable area beams 4a, and measures the reception powers (step S4-2). The power control unit 16 holds each of the measured reception powers. The power control unit 16 then determines an area beam 4a to be used for communication with the UE 2 on the basis of the results of measurement of the reception powers (step S4-3), and determines whether or not beam switching is needed (step S4-4).

When determining that the beam switching is needed (step S4-4 Yes), the power control unit 16 obtains a reception power difference ΔP between the pre-beam-switching area beam 4a and the post-beam-switching area beam 4a on the basis of the reception powers obtained in step S4-2 (step S4-5). The power control unit 16 then notifies the UE 2 of the beam switching instruction and the reception power difference ΔP (step S4-6). Note that the calculation of ΔP is made in a manner similar to formula (1) in the first embodiment.

Figure 16:
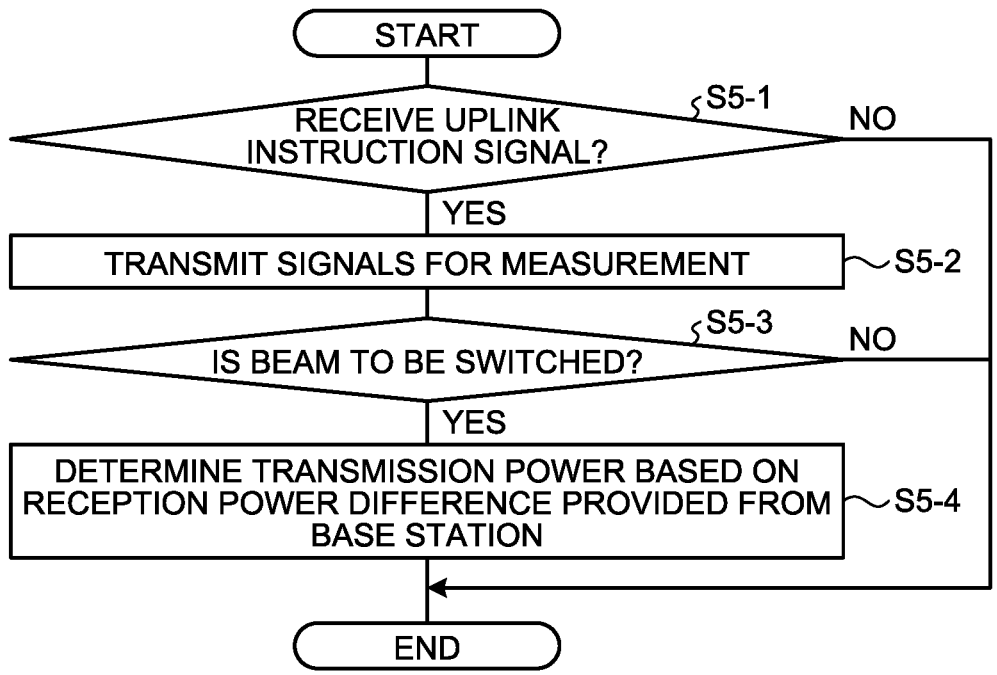
FIG. 16 is a flowchart illustrating an example of processing by a power control unit of a wireless terminal according to the fourth embodiment.

A flowchart of FIG. 16 illustrates an example of a process performed by the power control unit 26 of the UE 2, the process corresponding to the sequence illustrated in FIG. 14. The power control unit 26 of the UE 2 determines whether or not an uplink instruction signal is received from the radio base station 1 (step S5-1). When an uplink instruction signal is received (step S5-1 Yes), the power control unit 26 transmits signals for measurement to the radio base station 1 at the transmission timings over the transmission times as notified by the radio base station 1 (step S5-2). The power control unit 26 then determines whether or not a beam switching instruction is received from the radio base station 1 (step S5-3). When a beam switching instruction is received (step S5-3 Yes), the power control unit 26 determines the transmission power of an uplink transmission signal after beam switching on the basis of the reception power difference ΔP notified by the radio base station 1 (step S5-4). Note that the transmission power is obtained by calculation in a manner similar to formula (2) in the first embodiment.

Note that the fourth embodiment and the third embodiment can be combined. When beam switching is determined to be performed, the power control unit 16 of the radio base station 1 may check the radio-base-station position information on the beam source before beam switching and the radio-base-station position information on the beam source after beam switching, such that the power control unit 16 determines whether or not there is a difference in the radio-base-station position information between the pre-beam-switching and the post-beam-switching. When there is the difference in the radio-base-station position information between the pre-beam-switching and the post-beam-switching, the power control unit 16 notifies the UE 2 of a beam switching instruction and that transmission power control is to be performed under the open-loop power control. When the radio-base-station position information remains the same between the pre-beam-switching and the post-beam-switching, the power control unit 16 notifies the wireless terminal of the beam switching instruction, the reception power difference, and that transmission power control is to be performed on the basis of the reception power difference. Alternatively, the control method may be determined in another manner rather than on the basis of the radio-base-station position information before and after beam switching. For example, determination whether or not the quality of a pre-beam-switching beam and the quality of a post-beam-switching beam are similar to each other including the condition of interference can be made from results of measurements performed in advance by the radio base station 1. On the basis of such determination, determination can be made on whether the present control is to be applied or only the open-loop power control is to be used.

As described above, according to the fourth embodiment, the radio base station 1 receives signals for measurement transmitted by the wireless terminal, with formable corresponding beams, and measures the reception powers thereof as reception qualities. The radio base station determines whether or not to perform beam switching on the basis of the measured reception powers, and, when beam switching is to be performed, provides a notification that beam switching is to be performed and a notification of the reception power difference for determining the transmission power after beam switching. In addition, after performing the beam switching, the wireless terminal determines the transmission power on the basis of the reception power difference notified by the radio base station 1. That is, it becomes possible for the wireless terminal to appropriately perform the post-beam-switching transmission power control, even in the radio communication system configured to determine whether or not to perform beam switching on the basis of results of measurements of the reception qualities of signals for measurement transmitted by the wireless terminal.

Fifth Embodiment

The radio communication systems according to the embodiments described above are based on the assumption that the transmitting antenna gain and the receiving antenna gain of the radio base station are equal. For a radio communication system to reducing the cost, in some case, the directions are the same but the transmitting antenna gain and the receiving antenna gain are different from each other, that is, there is no beam correspondence. In such a case, beam switching on the uplink and beam switching on the downlink do not necessarily occur at the same time. In a fifth embodiment, transmission power control of a wireless terminal after beam switching in a radio communication system in a case where the transmitting antenna gain and the receiving antenna gain of a radio base station are different from each other will be explained. The radio communication system 10 of the present embodiment has a configuration similar to that in the first embodiment, and the radio base station 1 and the wireless terminal 2 also have configurations similar to those in the first embodiment. Hereinafter, the operation according to the present embodiment will be explained focusing on the difference from the first embodiment. Note that the radio base station 1 of the present embodiment performs both of beam forming for transmission and beam forming at reception, and beams 4 or area beams 4*a* refer to both transmission beams and received beams.

First, a description will be made as to transmission powers TxP in a case where the transmitting antenna gain and the receiving antenna gain of the radio base station 1 are equal to each other and in a case where the transmitting antenna gain and the receiving antenna gain of the radio base station 1 are different from each other. In the case where the transmitting antenna gain and the receiving antenna gain of the radio base station 1 are equal to each other and the transmission power is controlled by a mixture of open-loop power control and closed-loop power control, the relation equation of formula (6) is satisfied.

[Formula 6]

$$TxP = Pt + PLd + Tc \quad (6)$$

Pt and PLd in formula (6) relate to the open-loop power control, and Pt represents a reception power value which the radio base station 1 takes as a target value. PLd represents a path loss value estimated by the wireless terminal 2, and includes the transmitting antenna gain of the radio base station 1 and the path loss (power decay occurring during radio transmission) described in the first to fourth embodiments. Tc, which relates to the closed-loop power control, represents a power value according to a transmission power control command transmitted from the radio base station 1 to the wireless terminal 2 or a cumulative value thereof. In a case where the closed-loop power control is not performed, for example, TxP is obtained by a sum of Pt and PLd without Tc being taken into consideration.

In contrast, the power control unit 26 in the radio communication system according to the present embodiment determines the post-beam-switching transmission power TxP on the basis of a relation equation of formula (7).

[Formula 7]

$$TxP = Pt + PLd + Tc + \Delta Pd \quad (7)$$

Pt, Tc, and PLd in formula (7) are the same as those in formula (6). For calculation of the post-beam-switching transmission power TxP, PLd uses a path loss value obtained by measuring in advance the beam to be used after the switching or a path loss value obtained from a result of measurement immediately after the switching. $\Delta Pd$ represents the same as that in formula (1), which is a value obtained by subtracting the reception power P0 of the beam before beam switching occurring on downlink, from the reception power P1 of the beam after the beam switching.

Figure 17A:
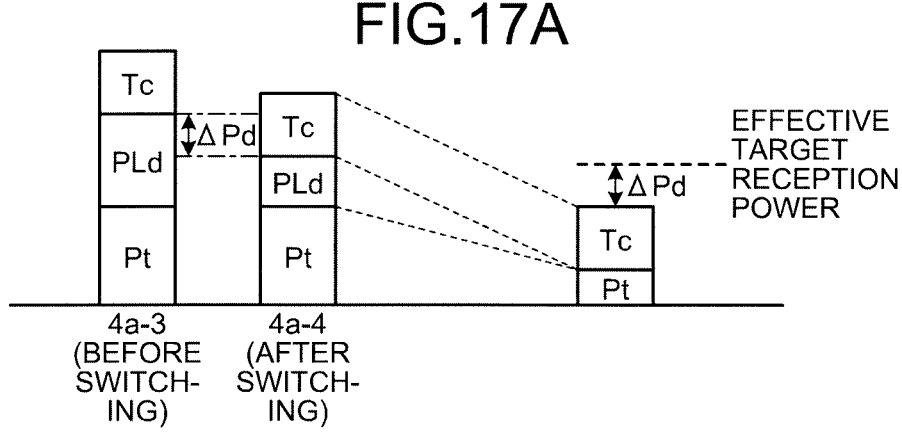
FIG. 17A and FIG. 17B are diagrams illustrating an example of transmission power determination performed by a wireless terminal according to a fifth embodiment.
Figure 17B:
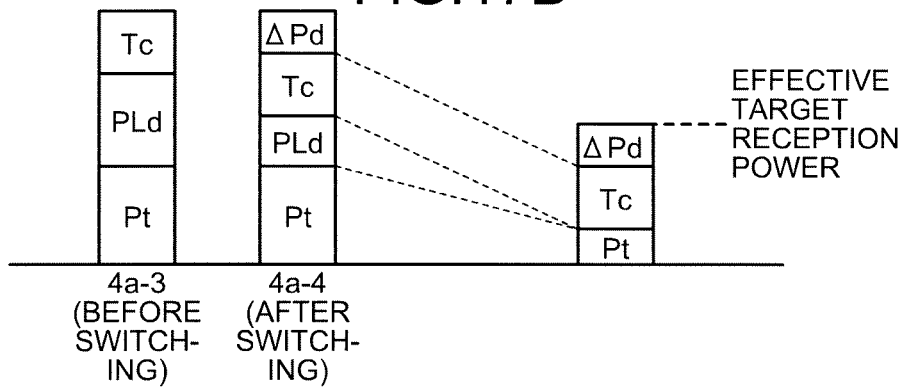

FIG. 17A and FIG. 17B illustrate diagrams illustrating the transmission power TxP of the wireless terminal 2 and the reception power of the radio base station 1 when the beam is switched from the beam 4*a*-3 to the beam 4*a*-4 in the radio communication system in the case where the transmitting antenna gain and the receiving antenna gain of the radio base station 1 are different from each other. The transmission power of the wireless terminal 2 before beam switching (4*a*-3), the transmission power of the wireless terminal 2 after beam switching (4*a*-4), and the reception power of the radio base station 1 after beam switching (4*a*-4) are illustrated in that order from the left. FIG. 17A illustrates the transmission power TxP obtained on the basis of formula (6) in the case where the transmitting antenna gain and the receiving antenna gain of the radio base station 1 are different from each other. In contrast, FIG. 17B illustrates the transmission power TxP obtained on the basis of formula (7) in the case where the transmitting antenna gain and the receiving antenna gain of the radio base station 1 are different from each other.

In FIG. 17A, a decay of $\Delta Pd$, which is a value obtained by subtracting the reception power P0 of the pre-switching beam (beam 4*a*-3) from the reception power P1 of the post-switching beam (beam 4*a*-4), is not considered in setting the post-beam-switching transmission power TxP. This means that use of the TxP set on the basis of formula (6) will result in a reception power at the base station that does not meet an effective target reception power representing a signal reception power with which a signal can be properly demodulated.

In contrast, in FIG. 17B, a decay of $\Delta Pd$, which is a value obtained by subtracting the reception power P0 of the pre-switching beam (beam 4*a*-3) from the reception power P1 of the post-switching beam (beam 4*a*-4), is considered in setting the post-beam-switching transmission power TxP. As a result, the TxP set on the basis of formula (7) is determined so that the reception power at the base station will meet the effective target reception power.

Note that, in a case where downlink beam switching further occurs after a lapse of time, the post-beam-switching transmission power TxP is newly determined on the basis of the relation equation of formula (7) using updated Pd_new. The updated Pd_new is the sum of new $\Delta Pd$ and previous $\Delta Pd$_old, as shown in formula (8) below.

[Formula 8]

$$\Delta Pd\_new = \Delta Pd\_old + \Delta Pd \quad (8)$$

Assume, for example, that the beam is switched from the beam 4a-3 to the beam 4a-4 and then further switched from the beam 4a-4 to the beam 4a-5. In this case, ΔPd, which is a value obtained by subtracting the reception power P0 of the beam 4a-3 from the reception power P1 of the beam 4a-4, is defined as ΔPd_old. ΔPd is a value obtained by subtracting the reception power of the beam 4a-4 from the reception power of the beam 4a-5. ΔPd_old is added to ΔPd to obtain ΔPd_new.

In some case, the radio base station 1 has received the signal with a target reception power, but the interference or the like can cause failure to demodulate a signal. In view of such a case, a signal reception power with which a signal can be properly demodulated is referred to herein as an effective target reception power. While beam switching is not performed, Tc is adjusted so that the execution target reception power is achieved.

While the above description is based on the assumption that the wireless terminal 2 calculates ΔPd, the radio base station 1 may alternatively provide notification of ΔPd. Because the wireless terminal 2 reports the measurement results to the radio base station 1 as explained in FIG. 6, the power control unit 16 of the radio base station 1 can calculate ΔPd. In this case, the radio base station 1 notifies the wireless terminal of the new ΔPd together with the beam switching instruction.

Alternatively, the newly obtained ΔPd may be reflected in Pt to provide a new Pt, and the radio base station 1 may notify the wireless terminal 2 of the new Pt instead of notifying the wireless terminal of ΔPd alone. In this case, Pt is updated as shown in formula (9) below, and the post-beam-switching transmission power TxP is then set on the basis of the relation equation of formula (7).

[Formula 9]

$$Pt = Pt\_old + \Delta Pd \tag{9}$$

Assume, for example, that the beam is switched from the beam 4a-3 to the beam 4a-4 and then further switched from the beam 4a-4 to the beam 4a-5. In this case, Pt used after switching from the beam 4a-3 to the beam 4a-4 is defined as Pt_old. Using the Pt_old, Pt is updated. The radio base station 1 notifies the wireless terminal 2 of the updated Pt.

In a similar manner, ΔPd may be reflected in Tc, and the radio base station 1 may notify the wireless terminal 2 of the new Tc at preset Tc transmission timing. In this case, Pt is updated as shown in formula (10) below, and the post-beam-switching transmission power TxP is then set on the basis of the relation equation of formula (7).

[Formula 10]

$$Tc = Tc\_old + \Delta Pd \tag{10}$$

As described above, even in the case where the transmitted beam gain and the received beam gain are different from each other and only downlink beam switching occurs, the uplink transmission power is determined using the reception power difference between the pre-switching beam and the post-switching beam. As a result, the radio base station 1 can obtain an appropriate reception power even when a downlink path loss value and an uplink path loss value are different from each other. In addition, reflection of ΔPd in Pt or Tc reduces the number of parameters managed by the wireless terminal 2, which simplifies the control.

Sixth Embodiment

The present embodiment presents transmission power control applied where the transmitting antenna gain and the receiving antenna gain are different from each other, only uplink beam switching occurs but the downlink beam having been used is still used as it is. The transmission power control in this embodiment uses a path loss obtained from results of measurement of the downlink beam.

The radio communication system 10 of the present embodiment has a configuration similar to that in the fourth embodiment, and the radio base station 1 and the wireless terminal 2 also have configurations similar to those in the fourth embodiment. Hereinafter, the operation according to the present embodiment will be explained focusing on the difference from the fourth embodiment. Note that the radio base station 1 of the present embodiment performs both of beam forming for transmission and beam forming at reception, and beams 4 or area beams 4a refer to both transmission beams and received beams.

The power control unit 26 in the radio communication system according to the present embodiment sets, on the basis of a relation equation of formula (11) below, the transmission power TxP for transmitting an uplink signal immediately after occurrence of the uplink beam switching.

[Formula 11]

$$TxP = Pt + PLd + Tc - \Delta Pu \tag{11}$$

Pt and Tc in formula (11) are the same as those in formula (6). PLd represents a latest path loss value obtained by measurement of a downlink signal. ΔPu represents a value obtained by subtracting the reception power P0 of the beam before beam switching occurring on uplink, from the reception power P1 of the beam after the beam switching.

Figure 18A:
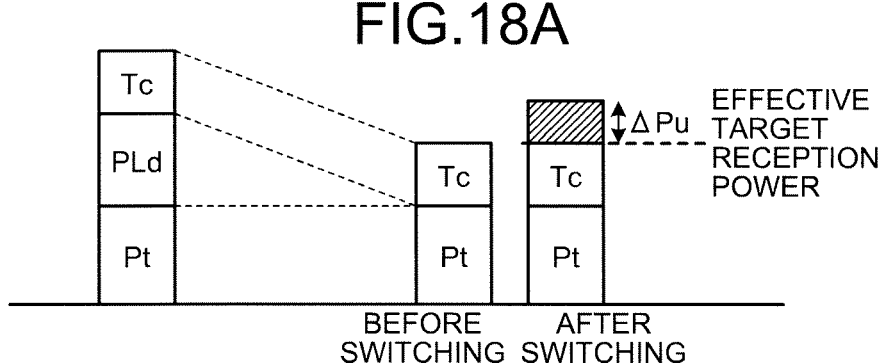
FIG. 18A and FIG. 18B are diagrams illustrating an example of transmission power determination performed by a wireless terminal according to a sixth embodiment.
Figure 18B:
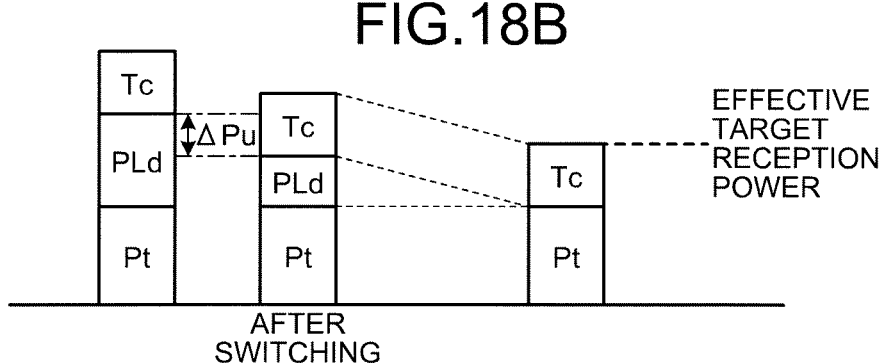

FIG. 18A and FIG. 18B illustrate diagrams illustrating the transmission power TxP of the wireless terminal 2 and the reception power of the radio base station 1 when the uplink beam is switched in the radio communication system in the case where the transmitting antenna gain and the receiving antenna gain of the radio base station 1 are different from each other. FIG. 18A illustrates the transmission power TxP obtained on the basis of formula (6) in the case where the transmitting antenna gain and the receiving antenna gain of the radio base station 1 are different from each other. In contrast, FIG. 18B illustrates the transmission power TxP obtained on the basis of formula (11) in the case where the transmitting antenna gain and the receiving antenna gain of the radio base station 1 are different from each other. In FIG. 18A, the transmission power of the wireless terminal 2, the reception power of the radio base station 1 before beam switching, and the reception power of the radio base station 1 after beam switching are illustrated in that order from the left. In FIG. 18B, the transmission power of the wireless terminal 2 before beam switching, the transmission power of the wireless terminal 2 after beam switching, and the reception power of the radio base station 1 after beam switching are illustrated in that order from the left.

When uplink beam switching occurs, the uplink path loss value tends to be smaller than that before the switching. In FIG. 18A, ΔPu, which is a value obtained by subtracting the reception power P0 of the pre-switching beam from the reception power P1 of the post-switching beam, is not considered in setting the post-beam-switching transmission power TxP. This means that use of the TxP set on the basis of formula (6) will result in a reception power at the base station that is larger than an effective target reception power representing a signal reception power with which a signal can be properly demodulated. Such a larger reception power at the base station provides a less efficiency.

In contrast, in FIG. 18B, ΔPu, which is a value obtained by subtracting the reception power P0 of the pre-switching beam from the reception power P1 of the post-switching beam, is considered in setting the post-beam-switching transmission power TxP. The TxP set on the basis of formula (11) can be an appropriate value so that the reception power at the base station will meet the effective target reception power.

Note that, in a case where downlink beam switching further occurs after a lapse of time, the post-beam-switching transmission power TxP is newly determined on the basis of the relation equation of formula (11) using updated Pu_new. The updated Pu_new is the sum of new ΔPu and ΔPu_old as in the fifth embodiment.

The radio base station 1 notifies the wireless terminal 2 of ΔPu. Because the radio base station 1 measures the reception powers of the respective beams for determination on uplink beam switching, the power control unit 16 can calculate ΔPu. Furthermore, the newly obtained ΔPu may be reflected in Pt, and the radio base station 1 may notify the wireless terminal 2 of the new Pt instead of notifying the wireless terminal 2 of ΔPu alone. Alternatively, ΔPu may be reflected in Tc, and the radio base station 1 may notify the wireless terminal 2 of the new Tc at preset Tc transmission timing.

Furthermore, the radio base station 1 may determine whether to apply the present control or to use only the open-loop power control in beam switching in a manner similar to the fourth embodiment. When there is the difference in the radio-base-station position information between the pre-uplink-beam-switching and the post-uplink-beam-switching, the power control unit 16 notifies the UE 2 of a beam switching instruction and that transmission power control is to be performed in accordance with the open-loop power control. When the radio-base-station position information remains the same between the pre-beam-switching and the post-beam-switching, the power control unit 16 notifies the wireless terminal 2 of the beam switching instruction, the reception power difference, and that transmission power control is to be performed on the basis of the reception power difference. Alternatively, the control method may be determined in another manner rather than on the basis of the radio-base-station position information before and after beam switching. For example, determination on whether or not the quality of a pre-switching beam and the quality of a post-switching beam are similar to each other including the condition of interference can be made on the basis of results of measurements performed in advance by the radio base station 1. On the basis of such determination, determination can be made on whether the present control is to be applied or only the open-loop power control is to be used.

As described above, even in the case where the transmitted beam gain and the received beam gain are different from each other and only uplink beam switching occurs, the uplink transmission power is determined using the reception power difference between the pre-switching beam and the post-switching beam. As a result, the radio base station 1 can obtain an appropriate reception power even when a downlink path loss value and an uplink path loss value are different from each other. In addition, reflection of ΔPd in Pt or Tc reduces the number of parameters managed by the wireless terminal 2, which simplifies the control.

Seventh Embodiment

The present embodiment presents transmission power control applied where the transmitting antenna gain and the receiving antenna gain are different from each other, and downlink beam switching and uplink beam switching occur at the same time. The transmission power control in this embodiment uses a path loss obtained from results of measurement of the downlink beam. A radio communication system 10 in the present embodiment has a configuration similar to that in the first and fourth embodiments. In addition, a wireless terminal 2 and a radio base station 1 of the radio communication system 10 also have configurations similar to those in the first and fourth embodiments.

The power control unit 26 in the radio communication system according to the present embodiment sets, on the basis of a relation equation of formula (12) below, the transmission power TxP for transmitting an uplink signal immediately after occurrence of the downlink beam switching and the uplink beam switching.

[Formula 12]

$$TxP = Pt + PLd + Tc + \Delta Pd - \Delta Pu \quad (12)$$

Thus, the operations explained in the fifth and sixth embodiments are combined

As described above, even in the case where the transmitted beam gain and the received beam gain are different from each other but downlink beam switching and uplink beam switching occur at the same time, the uplink transmission power is determined using the reception power difference between the pre-switching beam and the post-switching beam for each of the downlink and the uplink. The radio base station 1 can obtain an appropriate reception power even when a downlink path loss value and an uplink path loss value are different from each other.

While the cases where only the radio base station 1 performs beam forming have been described so far, a case where the wireless terminal 2 also performs beam forming has been studied in the 3GPP. In this case as well, measurements for determination on beam switching are not different from those in the sequences illustrated in FIG. 6 and FIG. 14. In a case where downlink signals are measured and a path loss is calculated, the wireless terminal 2 selects a received beam optimum for transmission beams from the radio base station 1, and thus the gain of the received beam is also included in the path loss value. PLd and ΔPd are calculated on this basis. Furthermore, in a case where uplink signals are measured and ΔPu is calculated, the base station selects a received beam optimum for transmission beams from the wireless terminal 2, and thus the gain of the terminal transmission beams is also reflected in the value of ΔPu. Thus, whether or not the wireless terminal 2 is performing beam forming does not affect the method explained above, and the method can also be applied to the case where the wireless terminal 2 performs beam forming.

The transmission power control method described in the above embodiments, which is applicable not only to the PUCCH but also to an uplink share channel (PUSCH: physical uplink shared channel) on which data are transmitted, a reference signal for measurement of uplink channel quality (SRS: sounding reference signal), can be applied to all the channels on which the transmission power control is performed.

The configurations presented in the embodiments above are examples of the present invention, and can be combined with other known technologies or can be partly omitted or modified without departing from the scope of the present invention.

REFERENCE SIGNS LIST 1 radio base station; 2, 2-1, 2-2, 2-3, 2-4 wireless terminal; 3, 3-1, 3-2, 3-3, 3-4, 3-5, 3-6, 3-7, 3-8 area; 4, 4-1, 4-2, 4-3, 4-4 beam; 4*a*, 4*a*-1, 4*a*-2, 4*a*-3, 4*a*-4, 4*a*-5, 4*a*-6, 4*a*-7, 4*a*-8 area beam; 5 service area; 10 radio communication system; 11 control unit; 12 modulation/demodulation unit; 13 transmission/reception unit; 14 antenna unit; 16 power control unit; 17 beam control unit; 101 processor; 102 memory; 103 transmitter; 104 receiver; 105 antenna; 21 control unit; modulation/demodulation unit; 23 transmission/reception unit; 24 antenna unit; 26 power control unit; 201 processor; 202 memory; 203 transmitter; 204 receiver; 205 antenna.

The invention claimed is:

1. A wireless terminal comprising:
an antenna to receive a plurality of beams formed by a radio base station, said radio base station being connected with a plurality of antennas having different installation positions; and
a power controller to adjust transmission power of an uplink signal transmitted from the antenna to the radio base station after beam switching, the beam switching being switching of a beam used for communication with the radio base station among the beams, wherein
when a beam used before the beam switching and a beam to be used after the beam switching are transmitted by a same one of the plurality of antennas, the power controller adjusts the transmission power of the uplink signal on a basis of a reception power difference determined at the wireless terminal between the beam used before the beam switching and the beam to be used after the beam switching, and
when the beam used before the beam switching and the beam to be used after the beam switching are transmitted by different ones of the plurality of antennas, the power controller adjusts the transmission power of the uplink signal on a basis of a different parameter than the reception power difference.

2. The wireless terminal according to claim 1, wherein when the beam used before the beam switching and the beam to be used after the beam switching are transmitted by the different ones of the plurality of antennas, the power controller determines the transmission power of the uplink signal on the basis of a reception power target value of the radio base station and a path loss estimation value of a downlink signal of the beam to be used after the beam switching.

3. A transmission power control method at a wireless terminal to switch a beam used for communication with a radio base station among a plurality of beams formed by the radio base station, said radio base station being connected with a plurality of antennas having different installation positions, the transmission power control method comprising:
determining whether or not to switch the beam used for communication;
when the beam used for communication is to be switched, adjusting transmission power of an uplink signal to be transmitted to the radio base station after the switching such that
when a beam used before the beam switching and a beam to be used after the beam switching are transmitted by a same one of the plurality of antennas, the transmission power of the uplink signal is adjusted on the basis of a reception power difference between the beam used before the switching and the beam to be used after the switching as determined at the wireless terminal, and
when the beam used before the beam switching and the beam to be used after the beam switching are transmitted by different ones of the plurality of antennas, the power controller adjusts the transmission power of the uplink signal on a basis of a different parameter than the reception power difference; and
transmitting the uplink signal after the switching, with use of the adjusted transmission power.

4. A radio base station comprising:
an antenna to simultaneously form a plurality of beams; and
a power controller to select a method for, on a basis of position information on a beam source used before beam switching and position information on a beam source to be used after the beam switching, determining transmission power of an uplink signal to be transmitted by a wireless terminal after the beam switching, the beam switching being switching of a beam used for communication with the wireless terminal among the beams, wherein
when the position information on the beam source before the beam switching and the position information on the beam source after the beam switching are different from each other, the power controller selects the method for determining the transmission power of the uplink signal on the basis of and a reception power target value of the radio base station and a path loss estimation value of a downlink signal of the beam to be used after the beam switching, and
when the position information on the beam source before the beam switching and the position information on the beam source after the beam switching are equal to each other, the power controller selects the method for determining the transmission power of the uplink signal on the basis of a transmission power difference between the beam used before the beam switching and the beam to be used after the beam switching at the wireless terminal.

5. The radio base station according to claim 4, wherein the power controller notifies the wireless terminal of a reception power target value of the radio base station, and
the power controller reflects a difference in the reception power between the beam used before the beam switching and the beam to be used after the beam switching, in the reception power target value transmitted before the beam switching, and notifies the wireless terminal of the reception power target value reflecting the difference.

6. The radio base station according to claim 4, wherein the power controller notifies the wireless terminal of a transmission power control command explicitly specifying an increase or decrease of transmission power, and
the power controller reflects a difference in the reception power of the beam used before the beam switching and the beam to be used after the beam switching, in a power value or a cumulative value indicated by the transmission power control command transmitted before the beam switching, and notifies the wireless terminal of the power value or the cumulative value reflecting the difference.

7. A radio base station comprising:
an antenna to simultaneously form a plurality of beams; and
a power controller configured to
obtain reception power of signals transmitted from a wireless terminal and received with the beams, calculate a difference in the reception power between a beam used before beam switching and a beam to be used after the beam switching, and notify the wireless terminal of the calculated difference in the reception power, the beam switching being performed by the wireless terminal and switching the beam used for communication with the radio base station from among the beams.

8. The radio base station according to claim 7, wherein when position information on a source of beam used before the beam switching and position information on a source of a beam to be used after the beam switching are different from each other, the power controller instructs the wireless terminal to determine transmission power of an uplink signal to be transmitted by the wireless terminal after the beam switching, on the basis of a reception power target value of the radio base station and a path loss estimation value of a downlink signal on the beam to be used after the beam switching.

9. The radio base station according to claim 8, wherein the power controller notifies the wireless terminal of a reception power target value of the radio base station, and the power controller reflects a difference in the reception power between the beam used before the beam switching and the beam to be used after the beam switching, in the reception power target value transmitted before the beam switching, and notifies the wireless terminal of the reception power target value reflecting the difference.

10. The radio base station according to claim 8, wherein the power controller notifies the wireless terminal of a transmission power control command explicitly specifying an increase or decrease of transmission power, and the power controller reflects a difference in the reception power between the beam used before the beam switching and the beam to be used after the beam switching, in a power value or a cumulative value indicated by the transmission power control command transmitted before the beam switching, and notifies the wireless terminal of the power value or the cumulative value reflecting the difference.

11. The radio base station according to claim 7, wherein the power controller notifies the wireless terminal of a reception power target value of the radio base station, and the power controller reflects a difference in the reception power between the beam used before the beam switching and the beam to be used after the beam switching, in the reception power target value transmitted before the beam switching, and notifies the wireless terminal of the reception power target value reflecting the difference.

12. The radio base station according to claim 7, wherein the power controller notifies the wireless terminal of a transmission power control command explicitly specifying an increase or decrease of transmission power, and the power controller reflects a difference in the reception power between the beam used before the beam switching and the beam to be used after the beam switching, in a power value or a cumulative value indicated by the transmission power control command transmitted before the beam switching, and notifies the wireless terminal of the power value or the cumulative value reflecting the difference.

13. A control circuit of a wireless terminal including an antenna to receive a plurality of beams formed by a radio base station, said radio base station being connected with a plurality of antennas having different installation positions, the control circuit comprising:

a power controller to adjust transmission power of an uplink signal transmitted from the antenna to the radio base station after beam switching, the beam switching being switching of a beam used for communication with the radio base station among the beams, wherein when a beam used before the beam switching and a beam to be used after the beam switching are transmitted by a same one of the plurality of antennas, the power controller adjusts the transmission power of the uplink signal on a basis of a reception power difference determined at the wireless terminal between the beam used before the beam switching and the beam to be used after the beam switching, and when the beam used before the beam switching and the beam to be used after the beam switching are transmitted by different ones of the plurality of antennas, the power controller adjusts the transmission power of the uplink signal on a basis of a different parameter than the reception power difference.

14. A non-transitory storage medium of a wireless terminal including an antenna to receive a plurality of beams formed by a radio base station, said radio base station being connected with a plurality of antennas having different installation positions, the medium storing a program which, when executed by a processor, performs:

adjusting transmission power of an uplink signal transmitted from the antenna to the radio base station after beam switching, such that when a beam used before the beam switching and a beam to be used after the beam switching are transmitted by a same one of the plurality of antennas, the transmission power of the uplink signal is adjusted on a basis of a reception power difference determined at the wireless terminal between a beam used before the beam switching and a beam to be used after the beam switching, and when the beam used before the beam switching and the beam to be used after the beam switching are transmitted by different ones of the plurality of antennas, the transmission power of the uplink signal is adjusted on a basis of a different parameter than the reception power difference, wherein the beam switching being switching of a beam used for communication with the radio base station among the beams.

* * * * *